United States Patent [19]
Joffe

[11] Patent Number: 5,901,147
[45] Date of Patent: May 4, 1999

[54] APPARATUS AND METHODS TO CHANGE THRESHOLDS TO CONTROL CONGESTION IN ATM SWITCHES

[75] Inventor: Alexander Joffe, Palo Alto, Calif.

[73] Assignee: MMC Networks, Inc., Sunnyvale, Calif.

[21] Appl. No.: 08/706,103

[22] Filed: Aug. 30, 1996

[51] Int. Cl.[6] .............................. H04L 12/28; H04L 12/56
[52] U.S. Cl. .......................... 370/412; 370/397; 370/468
[58] Field of Search ..................................... 370/230, 235, 370/252, 253, 395, 397, 412, 413, 415, 417, 468; 395/200.65

[56] References Cited

U.S. PATENT DOCUMENTS

| | | | |
|---|---|---|---|
| 2,686,844 | 8/1954 | Brewer | 179/81 |
| 4,885,744 | 12/1989 | Lespagnol et al. | 370/94 |
| 5,062,106 | 10/1991 | Yamazaki et al. | 370/94.1 |
| 5,233,606 | 8/1993 | Pashan et al. | 370/85.6 |
| 5,311,509 | 5/1994 | Heddes et al. | 370/60 |
| 5,337,308 | 8/1994 | Fan | 370/60 |
| 5,457,687 | 10/1995 | Newman | 370/85.3 |
| 5,517,495 | 5/1996 | Lund et al. | 370/60 |
| 5,528,588 | 6/1996 | Bennett et al. | 370/60 |
| 5,541,912 | 7/1996 | Choudhury | 370/17 |
| 5,555,264 | 9/1996 | Sallberg | 370/17 |
| 5,557,611 | 9/1996 | Cappellari et al. | 370/60.1 |
| 5,583,863 | 12/1996 | Darr, Jr. et al. | 370/397 |
| 5,592,476 | 1/1997 | Calamvokis et al. | 370/390 |
| 5,629,928 | 5/1997 | Calvignac | 370/237 |
| 5,633,859 | 5/1997 | Jain et al. | 370/234 |
| 5,633,867 | 5/1997 | Ben-Nun et al. | 370/399 |
| 5,689,508 | 11/1997 | Lyles | 370/391 |
| 5,704,047 | 12/1997 | Schneeberger | 395/200.65 |
| 5,715,250 | 2/1998 | Watanabe | 370/395 |
| 5,719,853 | 2/1998 | Ikeda | 370/229 |
| 5,748,629 | 5/1998 | Caldara et al. | 370/389 |
| 5,751,951 | 5/1998 | Osborne et al. | 395/200.8 |

FOREIGN PATENT DOCUMENTS

WO 95/20282  7/1995  WIPO.
WO 95/32570  11/1995  WIPO.

OTHER PUBLICATIONS

Tanenbaum, Andrew S., "Computer Networks" (Prentice Hall PTR, 3rd Ed., 1996), pp. 148–150.

Li, Hongqing, et al., "Performance Of TCP Over UBR Service In ATM Networks With Per–VC Early Packet Discard Schemes" *1996 IEEE Int'l Conf. on Communications (ICC), Converging Technologies for Tommorrow's Applications,* Dallas, Jun. 23–27, 1996, pp. 350–357.

Hongqing Li et al. "A Simulation Study of TCP Performance in ATM Networks With ABR and UBR Services" *Proceedings vol. 3, 1996 IEEE Infocom '96, Fifteenth Annual Joint Conference of the IEEE Computer and Communications Societies,* Mar. 24–28, pp. v–xvi and pp. 1269–1276 (21 pages total including cover page).

Allyn Romanow et al. "Dynamics of TCP Traffic Over ATM Networks" *IEEE Journal on Selected Areas in Communications,* vol. 13, No. 4, pp. 633–641, May 1995.

Flanagan, William A., "ATM [Asynchronous Transfer Mode] User's Guide", (Flatiron Publishing, Inc., New York, 1994), pp. 25–49.

Dutton, Harry J.R. and Lenhard, Peter, "Asynchronous Transfer Mode (ATM) Technical Overview" (IBM, Prentice–Hall PTR, New Jersey, 1995), pp. 3–1 through 3–25 and 9–1 through 9–34.

(List continued on next page.)

*Primary Examiner*—Chau Nguyen
*Assistant Examiner*—Thinh Vu
*Attorney, Agent, or Firm*—Skjerven Morrill MacPherson Franklin & Friel LLP; Michael Shenker

[57] ABSTRACT

In an ATM switch, queue thresholds vary dynamically depending on switch congestion. All the queues are organized in one or more classes. The thresholds for each class depend inversely on the number of cells in all the queues of the class.

32 Claims, 32 Drawing Sheets

OTHER PUBLICATIONS

Beraldi, R., et al: "Selective BECN Schemes for Congestion Control of ABR Traffic in ATM LAN", 1996 IEEE Int'l. Conf on Communications, Converging Technologies for Tomorrow's Applications,, Dallas, Jun. 23–27, 1996. pp. 503–507.

Ozveren, C., et al: "Reliable and Efficient Hop–By–Hop Flow Control" Computer Communications Review, vol. 24, No. 4, Oct. 1, 1994, pp. 89–100.

Alan Demers et al. "Analysis and Simulation Of A Fair Queueing Algorithm" ©1989 ACM, pp. 1–12.

"ATMS2003B Switch Controller 1 'White'", *MMC Networks,* Dec. 1995, 32 pages.

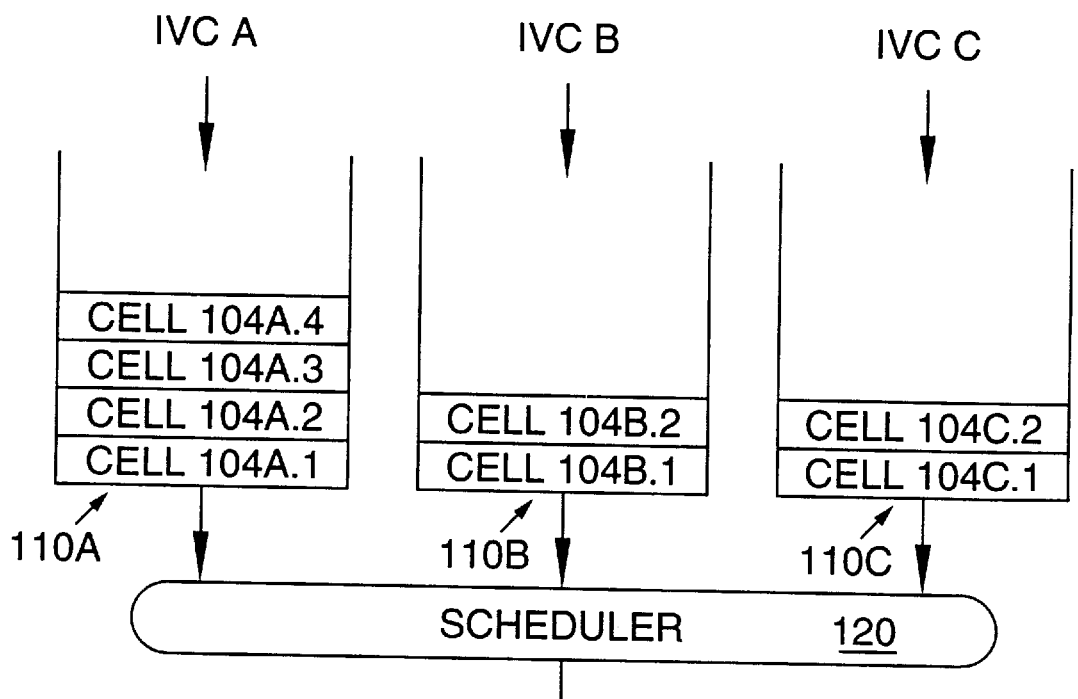
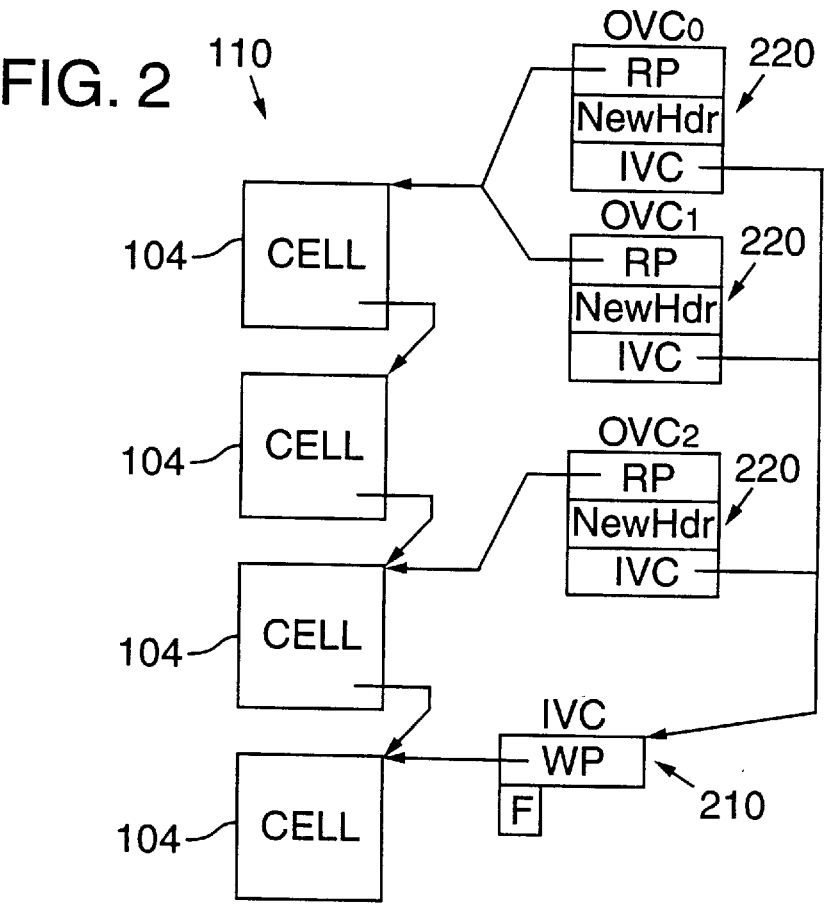

FIG. 39

| TABLE | ID | 31 ... 0 |
|---|---|---|
| ECNT | 0110 | N M EST ECNT |
| CLID | 0101 | I E CLID |
| WP | 0010 | WP |
| OCNT | 0111 | OCNT |
| LINK | 0001 1001 | M L LINK |
| CCNT | 0000 1000 | CCNT |
| IVC | 0100 | IVC |
| NCH | 0011 | V NCH |

FIG. 40

| TABLE | ID | 31 ... 0 |
|---|---|---|
| CHP | 0011 | R CHP |
| CTP | 0010 | CTP |
| IVC | 0110 | A D IVC |
| NXT | 0111 | R NXT |
| RP | 0001 | M L RP |
| TP | 0000 | F P H C TP |

APPARATUS AND METHODS TO CHANGE THRESHOLDS TO CONTROL CONGESTION IN ATM SWITCHES

BACKGROUND OF THE INVENTION

The present invention relates to networks, and more particularly to controlling congestion in ATM switches in networks.

Since an ATM switch may be unable to transmit a cell to a downstream station before another cell arrives, the switch queues arriving cells. When the queue fills the entire memory allocated for the queue, the incoming cells are discarded.

Some ATM switches have a separate queue for each output port or sub-port and/or for each priority. For example, some switches have 32 ports; for each port, four queues are maintained for respective four different priorities. The total number of queues is thus 32*4=128. In some switches, each queue is kept in a separate memory. In other switches, a shared memory is used for all the queues. A shared memory allows any given queue to take more than its proportionate share of the memory provided one or more other queues take less memory than their proportionate share. However, a long queue can take the whole shared memory, leaving no room for other queues. To reduce such a possibility, the number of cells in any given queue is limited by a threshold. If the number of cells in a given queue exceeds the threshold, the arriving cells destined for the queue become subject to a congestion reduction action; for example, the arriving cells are discarded, or cells are transmitted with an overload indication.

It is desirable to find alternative circuits and methods for handling the switch congestion.

SUMMARY

The present invention allows changing thresholds depending on the switch congestion. In some embodiments, the thresholds vary inversely with the total number of cells in all the queues. Thus, when the total number of cells increases, the thresholds decrease.

Such variable thresholds are particularly valuable for embodiments having a large number of queues. Indeed, when the number of queues is large, and the thresholds are not variable but constant, the thresholds are set low because any one queue should not be allowed to take much memory in the presence of many other queues. In contrast, if the thresholds are variable, they can be high as long as the total number of cells in the shared memory is low. The thresholds are low only when the total number of cells is high.

In some embodiments, many queues are formed because the switch maintains a separate queue for each input virtual channel (IVC). We will refer to such queuing as "per-VC queuing". Some per-VC queuing switches have thousands of IVCs and hence thousands of queues.

Some embodiments define one or more classes of queues. Each class has its own thresholds for its queues. In each class, the thresholds vary inversely with the total number of cells in all the queues of the class. Therefore, congestion in one class does not cause threshold reduction in other classes.

In some per-VC queuing switches, queues of each given class have a certain traffic characteristic as defined by their quality of service (QoS) parameter or parameter range. The traffic characteristic is taken into account when the thresholds are determined. Thus, some switches set lower thresholds for classes with lower cell-delay and cell-delay-variation parameters, and higher thresholds for classes with lower cell loss rates. Congestion for queues having one traffic characteristic (e.g., a high cell delay parameter and thus low priority) does not cause threshold reduction for queues having a different traffic characteristic (e.g., higher priority).

In some embodiments, the number of classes is small relative to the number of queues. For example, there are only sixteen classes in some embodiments. Therefore, the amount of memory given to any particular class can be high. In some embodiments, the upper memory limit set for each class is the entire shared memory.

In per-VC queuing switches, when a queue exceeds its threshold and triggers a congestion reduction action, this action affects only the IVC corresponding to that queue and does not affect other IVCs.

Other features and advantages of the invention are described below. The invention is defined by the appended claims.

BRIEF DESCRIPTION OF THE DRAWINGS

FIG. 1 illustrates per-VC queues of ATM cells in an ATM switch according to the present invention.

FIG. 2 illustrates data structures used to maintain the queues of FIG. 1.

FIGS. 35–51 illustrate registers and register fields in the switch of FIG. 25.

DESCRIPTION OF PREFERRED EMBODIMENTS

Figure 3:
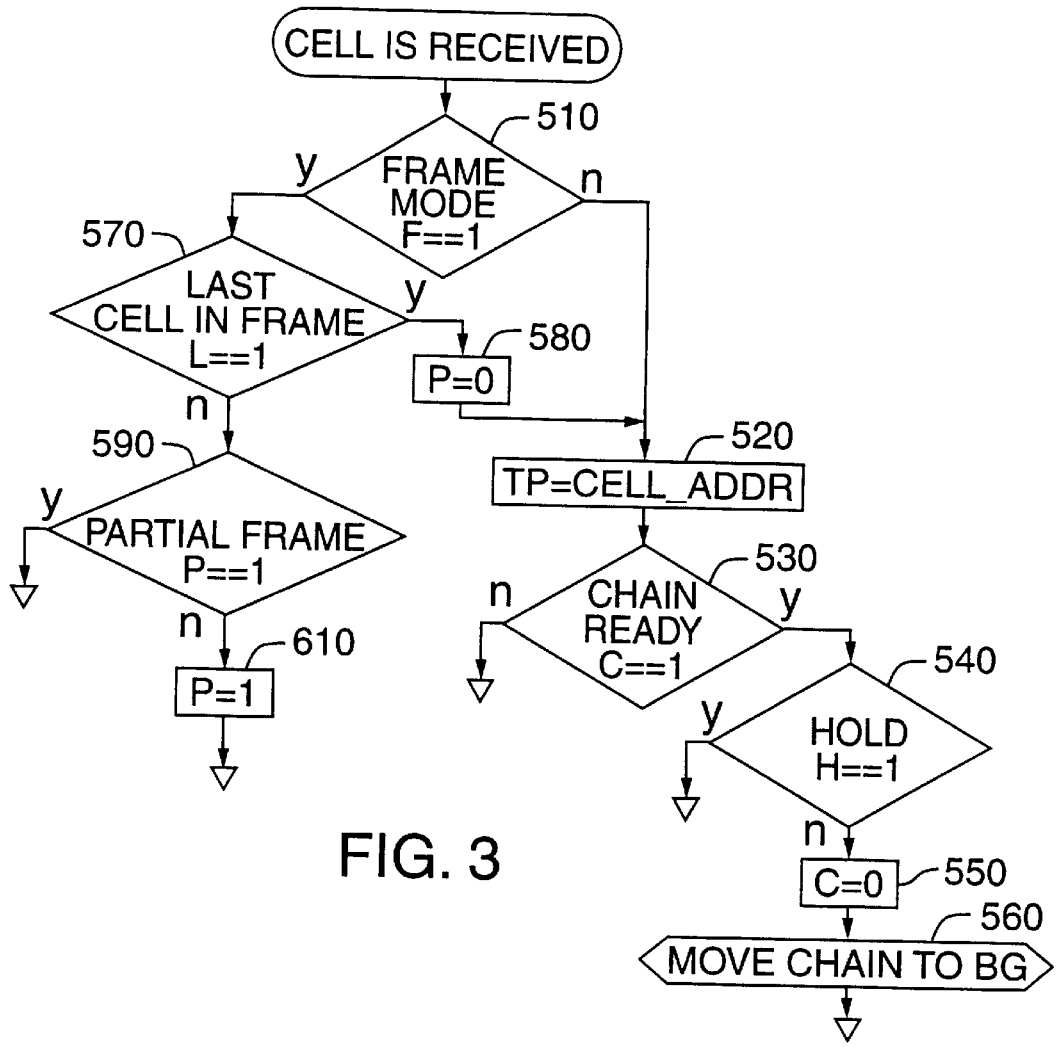
FIGS. 3 and 4 are charts illustrating the operation of an ATM switch of the present invention when a cell is received.

An ATM switch threshold function is described below. Per-VC queuing is described first.

FIG. 1 illustrates queues 110A, 110B, 110C of ATM cells in an ATM switch. If the switch is a VC switch, then a separate queue 110 is allocated for cells received on a given port or sub-port and having a given VCI and a given VPI. Thus, cells 104A received on an IVC A are written to queue 110A; cells 104B received on an IVC B are written to queue 110B; cells 104C received on an IVC C are written to queue 110C. Scheduler 120 schedules the cells for transmission.

If the switch is a VP switch, a separate queue 110 is allocated for cells received on a given port or sub-port and having a given VPI. The term "per-VC queuing" herein refers both to VC switches having a separate queue for each IVC and to VP switches having a separate queue for each input VP. The description of VC switches below applies to VP switches if "virtual channel" is replaced by "virtual path", except where it is obvious that such a replacement is inappropriate.

In some embodiments, an ATM connection can operate in a frame based operation mode (FBOM) or a non-FBOM ("normal") mode. At any given time, some connections may be FBOM connections and other connections may be normal connections. We describe the normal mode first.

Operation of the ATM switch is divided into two stages: an input stage and an output stage. At the input stage, cells 104 are received and linked to queues 110 according to the cells' input VCs. For each cell 104, the ATM switch stores a data structure described in Appendix 1 at the end of this description (before the claims). The data structure includes a Next Cell pointer NXT used to link the cells in queue 110.

FIG. 2 illustrates data structures stored in the ATM switch for a single connection, and thus for a single IVC and a single queue 110. Each IVC is described by a respective IVC structure 210. We will sometimes call structure 210 simply an IVC. IVC fields are described in Appendix 2. In each IVC, a Write Pointer (WP) points to the last cell in respective queue 110. Flag F=1 indicates an FBOM connection; F=0 indicates a normal connection.

FIG. 2 illustrates a multicast connection with three output virtual channels (OVCs) $OVC_0$, $OVC_1$ and $OVC_2$. Each OVC is described by a respective OVC structure 220 which we will call simply an OVC. Fields of OVC 220 are described in Appendix 3. As shown therein and in FIG. 2, each OVC includes: 1) a Read Pointer RP pointing to the next cell to transmit on the OVC; 2) field NewHDR containing the VPI and VCI of the new header for the OVC; and 3) the number "IVC" of the respective ("parent") IVC; this number is a pointer to IVC 210.

Figure 4:
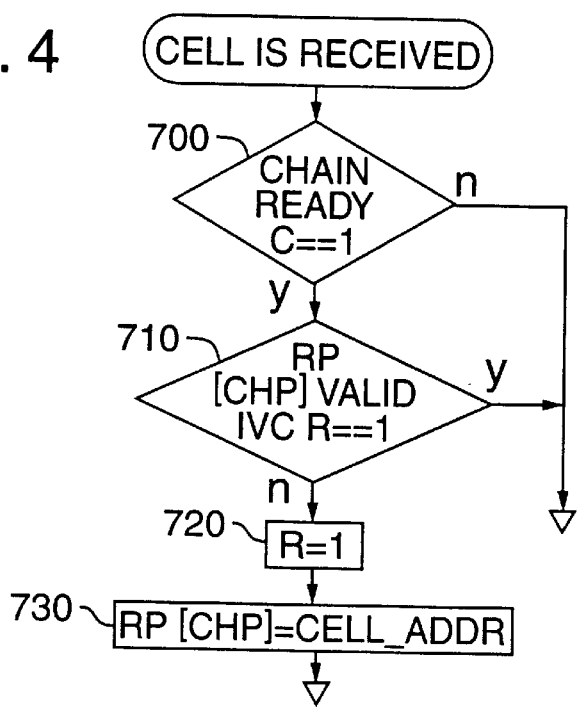
Figure 5:
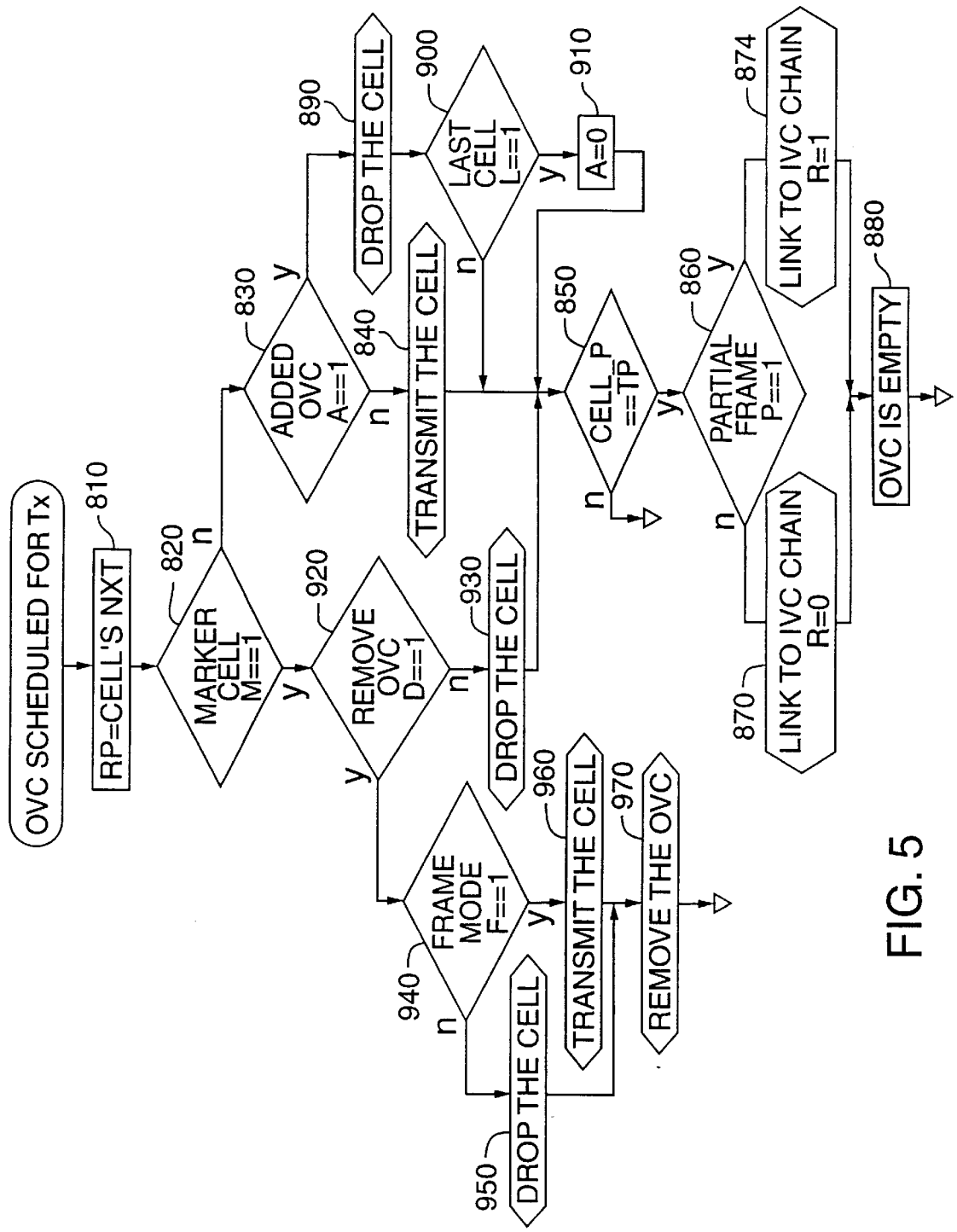
FIG. 5 is a chart illustrating the operation of an ATM switch of the present invention when a cell is scheduled for transmission.
Figure 6:
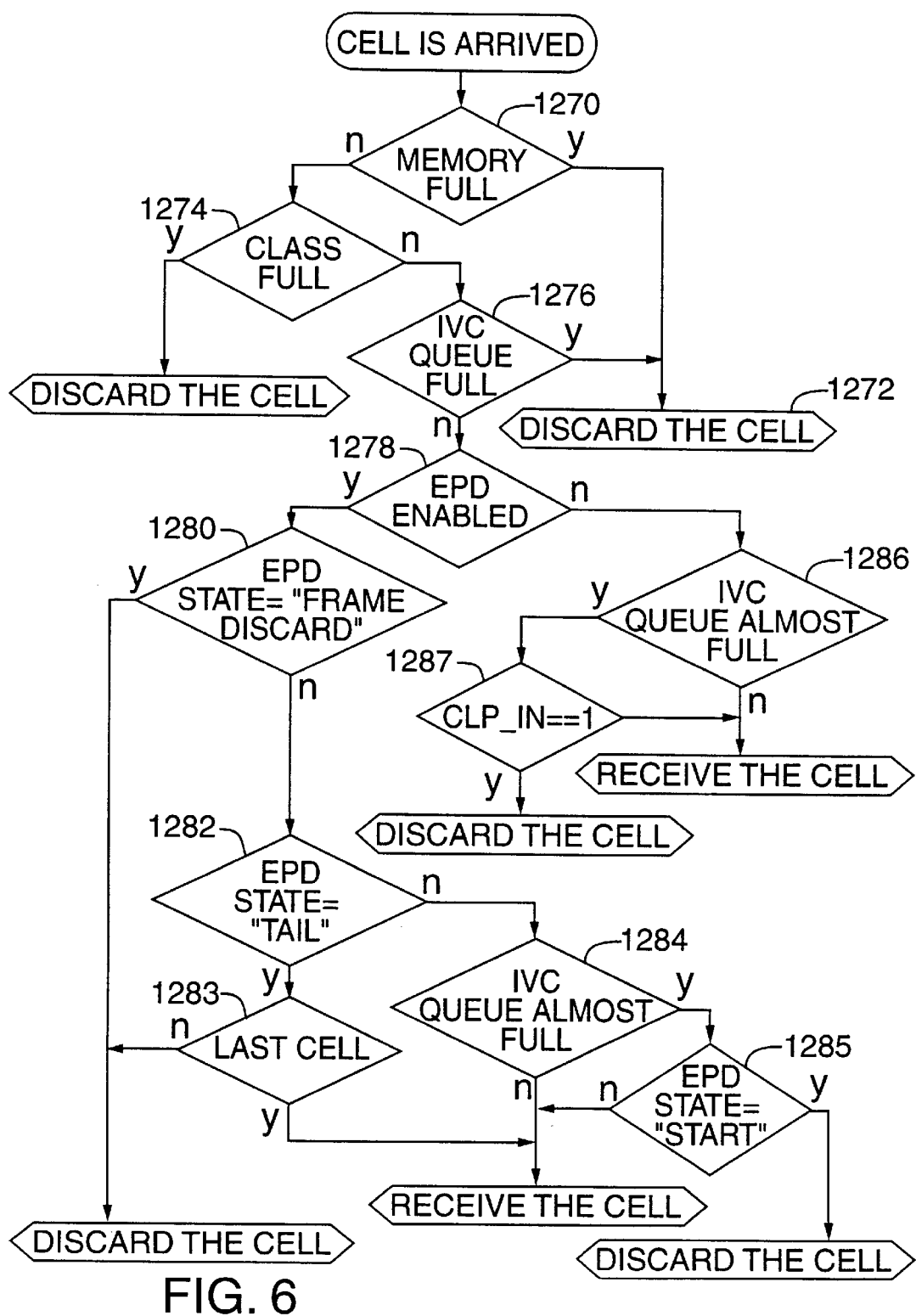
FIG. 6 is a chart illustrating how an ATM switch of the present invention determines whether an incoming cell is to be discarded.

Appendix 4 illustrates steps performed to set up a new connection. Appendix 5 illustrates steps performed to add a party (an OVC) to an existing connection. Appendix 6 and FIGS. 3 and 4 illustrate steps performed when a new cell is received. FIG. 5 illustrates steps performed to transmit a cell. FIG. 6 illustrates steps performed to determine whether a cell is to be discarded. Appendices 4–6 and FIGS. 3–6 are discussed below.

OVCs belonging to the same IVC may or may not be connected to different output ports or sub-ports. A sub-port is a logical port; a group of sub-ports share the same physical port.

Different output VCs corresponding to the same IVC may be in different states at the same time. For example, one OVC may have finished sending all cells from respective queue 110 (i.e., the queue 110 may be empty for this OVC), while other OVCs are still sending cells from the queue. When a cell 104 has been transmitted by all OVCs corresponding to the IVC, the cell is dequeued, and the cell's memory is returned to a stack of free cell buffers. In the corresponding IVC, the counter ECNT (the count of cells in the IVC queue, see Appendix 2), is decremented.

Figure 7:
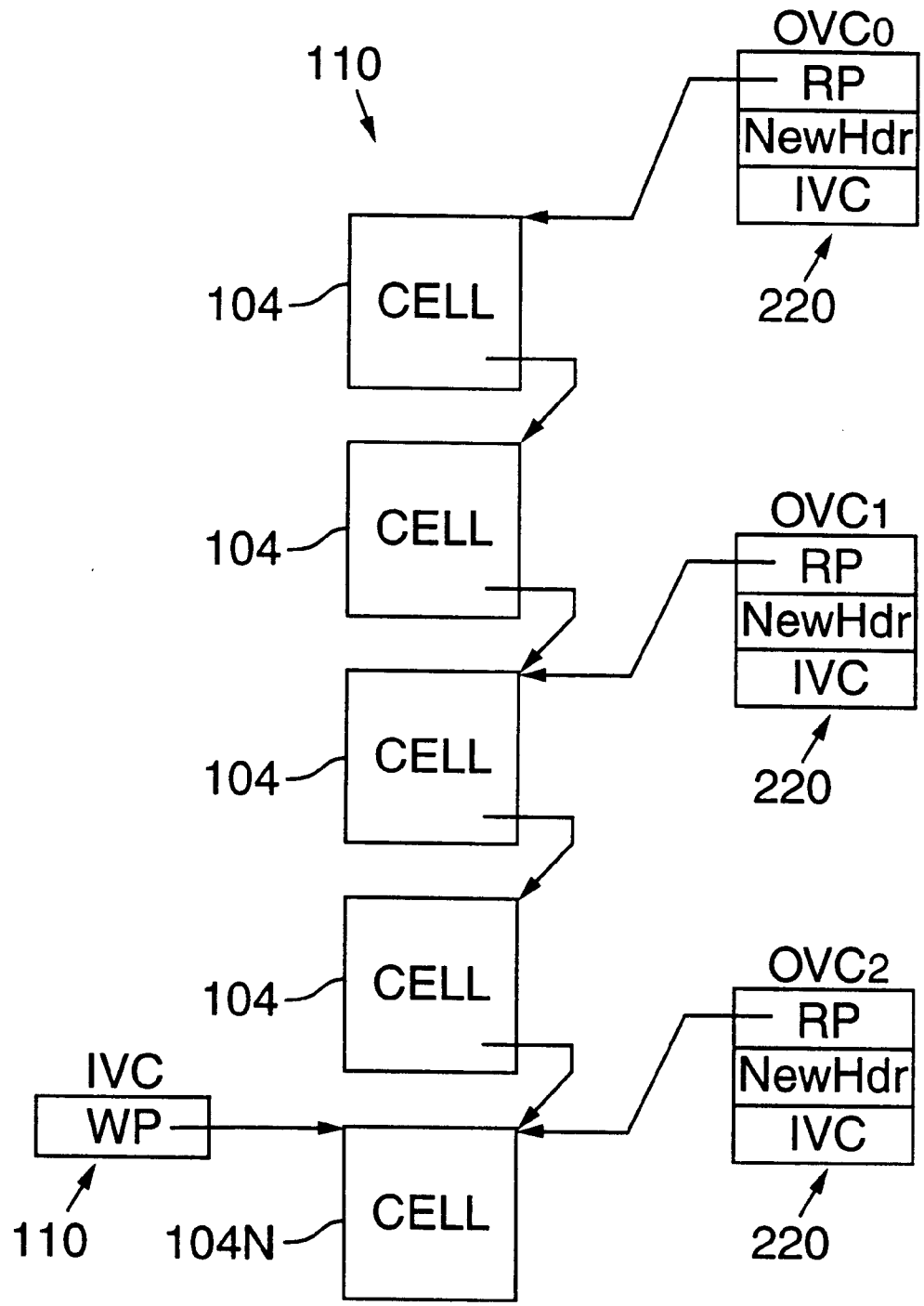
FIGS. 7–11 illustrate data structures at different stages of operation of an ATM switch of the present invention.

When a new cell (cell 104N in FIG. 7) is received on the IVC, the cell is linked at the end of the queue 110. ECNT is incremented (step 2b in Appendix 6). The Read Pointers of the empty OVCs ($OVC_2$ in FIG. 7) are set to point to this new cell (step 3a-2 in Appendix 6). OVC structures 220 for non-empty OVCs ($OVC_0$ and $OVC_1$ in FIG. 7) do not change.

As shown in Appendix 3, each OVC 220 includes: a flag L used in FBOM to indicate whether the cell pointed to by the OVC's RP is the last cell of a frame; and a flag M indicating whether the cell pointed to by RP is a marker cell. Marker cells are used to remove OVCs, as described below. In an ATM switch shown in FIG. 25, the fields RP, L, and M of each OVC are stored in a 20-bit field (see entry "RP" in Table 4 below). Correspondingly, each cell data structure has 20 bits that contain the cell's NXT (Appendix 1) and the cell's flags L and M. L indicates whether the next cell is the last cell in a frame. M indicates whether the next cell is a marker cell. When an OVC transmits a cell, the cell's 20-bit field (NXT, L, M) is copied to the OVC's (RP, L, M) field in parallel.

Figure 8:
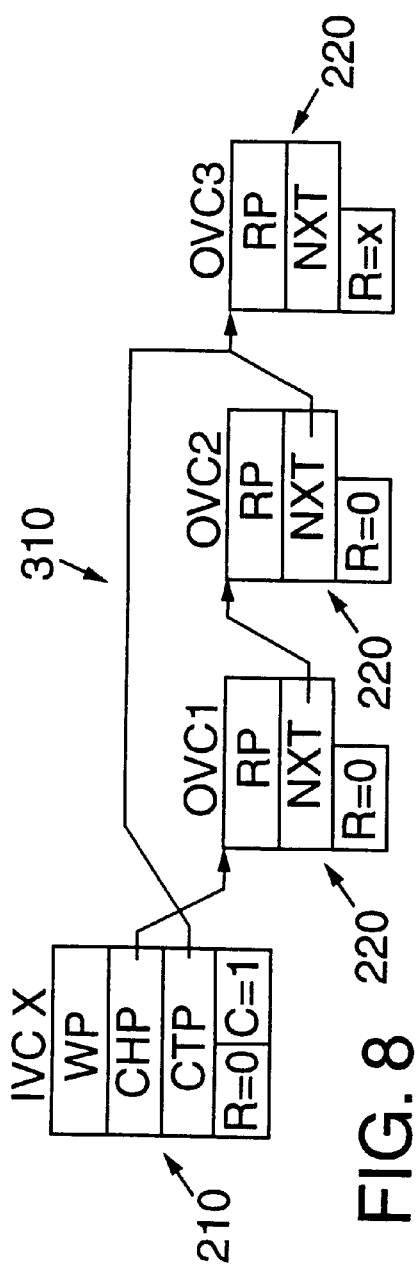

When OVCs of a given IVC are empty, they are linked in a linked list 310 (FIG. 8). We will call the list 310 an IVC chain of OVCs. In FIG. 8, OVCs OVC1, OVC2, OVC3 belong to IVC X. These OVCs are empty. This means that either: (1) the respective queue 110 is empty, or (2) queue 110 is not empty, but all the cells in the queue have been transmitted by OVC1, OVC2, and OVC3. If queue 110 is not empty, one or more other OVCs corresponding to IVC X have not transmitted all the cells in the queue.

Empty OVCs OVC1, OVC2, OVC3 are linked together using their NXT fields (Appendix 3). IVC's Chain Head Pointer CHP (Appendix 2) points to the first OVC (OVC1) in chain 310. IVC's Chain Tail Pointer CTP points to the last OVC (OVC3) in chain 310.

Figure 25:
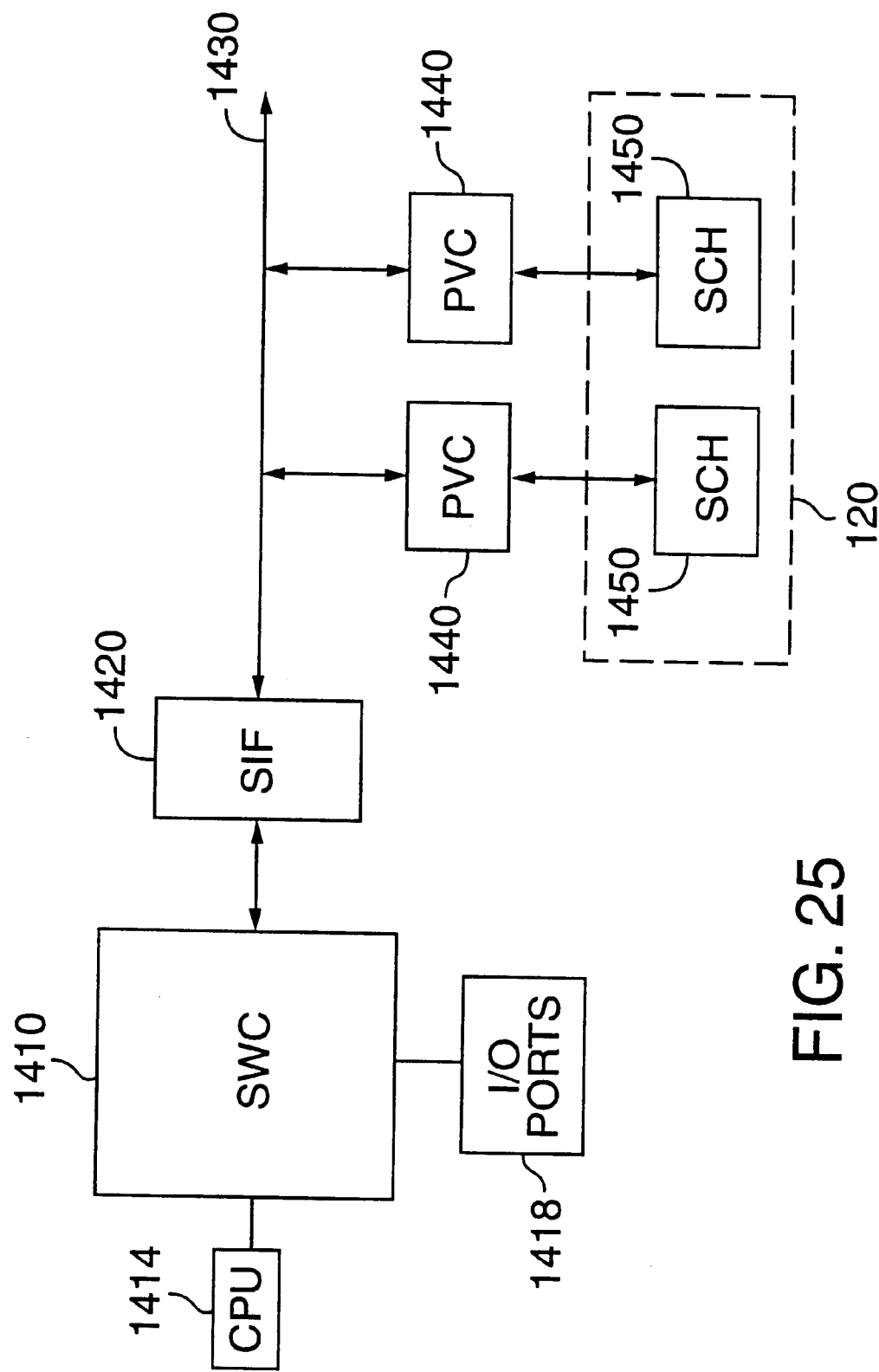
FIG. 25 is a block diagram of an ATM switch of the present invention.

In the switch of FIG. 25 described in more detail below, each EVC (per-VC controller) 1440 handles a separate set of output ports, and each PVC has its own chain 310 for the OVCs transmitting on the output ports handled by the PVC.

Figure 9:
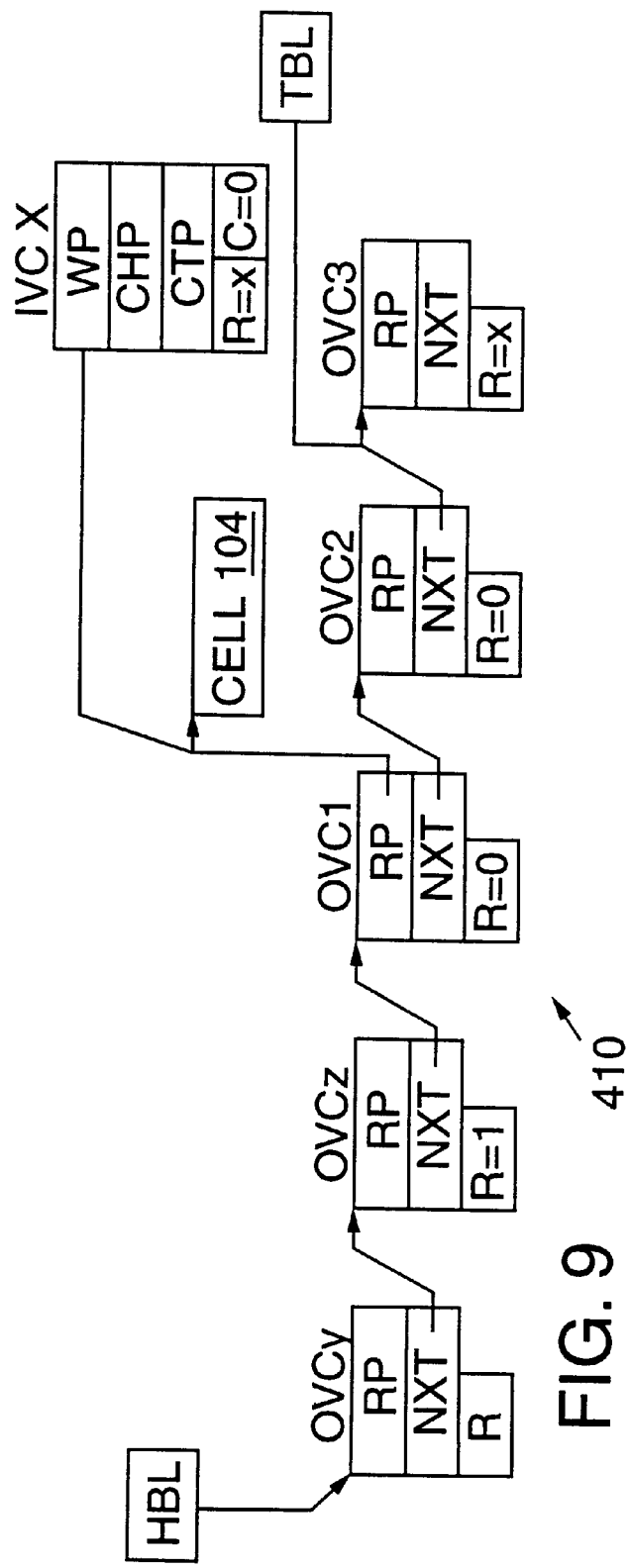

When a cell is received on IVC X at the stage of FIG. 8, a pointer to this cell is to be written to the RP field of each OVC in each chain 310, and the L and M flags of each OVC in each chain 310 are to be set to appropriate values. This operation takes several clock cycles. Therefore, it is performed in the background. More particularly, when a cell is received on IVC X, only the first OVC (OVC1 in FIG. 8) in each chain 310 in each PVC 1440 gets its pointer RP and flags L, M set to appropriate values (step 3a-2 in Appendix 6, step 730 in FIG. 4). At the same time, all OVCs from each chain (OVC1, OVC2, OVC3 in FIG. 8) are moved to the end of "background" ("BG") list 410 (FIG. 9). Each PVC 1440 has a single background list 410 for all the IVCs. OVCs are added to list 410 in the same order as they were in respective chain 310. In each PVC 1440, a pointer HBL (Head of Background List) points to the first OVC in list 410 (OVCy in FIG. 9); a pointer TBL (Tail of Background List) points to the last OVC (OVC3) in list 410. In each PVC 1440, "background" circuitry (not shown) will copy the field (RP, L, M) of the first OVC moved from chain 310 (OVC1 in FIG. 9) to the fields (RP, L, M) of all the OVCs which follow the first OVC in list 410 and which have invalid RPs (OVC2, OVC3 in FIG. 9). We will call the operation of the background circuitry in each PVC 1440 a "background job".

In frame based operation mode, an OVC is in a chain 310 if the OVC has transmitted all the cells in queue 110 or the only cells not transmitted by the OVC are cells of a partial frame (that is, a frame that has not been completely received on the respective IVC). When the OVC gets a full frame to transmit, the OVC is moved to respective list 410.

Each IVC structure 210 has a flag C (Chain Ready) in each PVC 1140 to indicate whether the IVC's chain 310 in the PVC is not empty. See entry "TP" in Table 4 below. Only one flag C is shown in Appendix 2 and FIGS. 8 and 9. (Of note, some switches include only one PVC 1440.) In FIG. 8, C=1 (chain 310 is not empty). In FIG. 9, C=0.

Each IVC structure 210 has a flag R in each PVC 1440 to indicate whether the Read Pointer RP of the first OVC in respective chain 310 is valid. Only one flag R is shown in Appendix 2 and FIGS. 8 and 9. In FIG. 8, OVC1 is empty, and therefore IVC X has R=0 (RP invalid). In FIG. 9, chain 310 is empty, and hence R=x ("don't care").

Similarly, each OVC structure 220 has a flag R in respective PVC 1440 to indicate whether the read pointer RP[NXT] of the next OVC is valid. See Appendix 3 and Table 4, entry IVC/NXT. Thus, as long as the NXT pointer of OVC1 points to OVC2, the R flag of OVC1 is 1 if RP of OVC2 is valid. In FIG. 8, OVC2 and OVC3 are empty, and hence the R flags in OVC1, OVC2 are 0. The R flag of OVC3 is "x" ("don't care").

Figure 27:
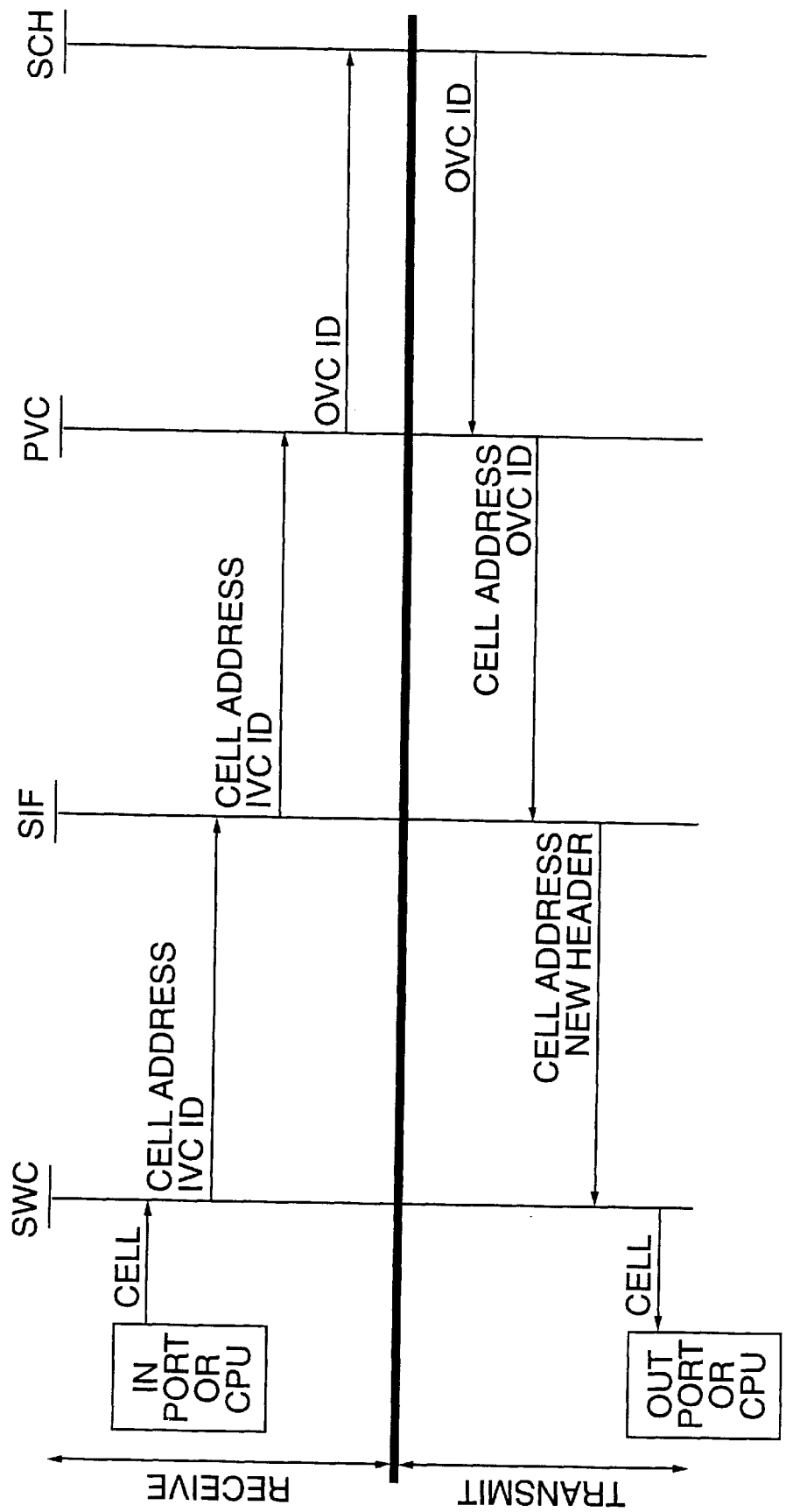
FIG. 27 illustrates flow of data between blocks of FIG. 25.

Each background circuitry goes through respective list 410, performing the following operation for each OVC in the list:

if OVC's RP is valid, then
temp_RP_L_M=OVC's RP, L, M
temp_R=OVC's flag R
remove OVC from background list and transfer OVC to scheduler (the transfer PVC → SCH in FIG. 27 described below)
else (RP invalid)
OVC's RP, L, M=temp_RP_L_M
OVC's flag R=temp_R
remove OVC from background list and transfer OVC to scheduler (PVC → SCH in FIG. 27).

Above, temp_RP_L_M and temp_R are storage locations in the background circuitry in each PVC 1440.

Each cell 104 includes a Copy Counter field CCNT (Appendix 1) which stores the number of OVCs to which the cell is to be transmitted. When a cell is received, its counter CCNT is initialized to the number OCNT of OVCs which belong to the IVC (Appendix 6, step 1b). This number OCNT (Output Counter) is stored in the corresponding IVC 210 (Appendix 2; see also Appendix 4, step 1a). Every time a cell is transmitted, its CCNT is decremented. When CCNT reaches zero, the cell memory is released.

To add a new OVC to a multicast connection, the following steps are performed (Appendix 5):

1. A new OVC is created and linked to the chain 310 of corresponding IVC 210 (Appendix 5, steps 1a, 1b) in respective PVC 1440.
2. Output Count OCNT in the IVC is incremented (Appendix 5, step 1c).

Figure 10:
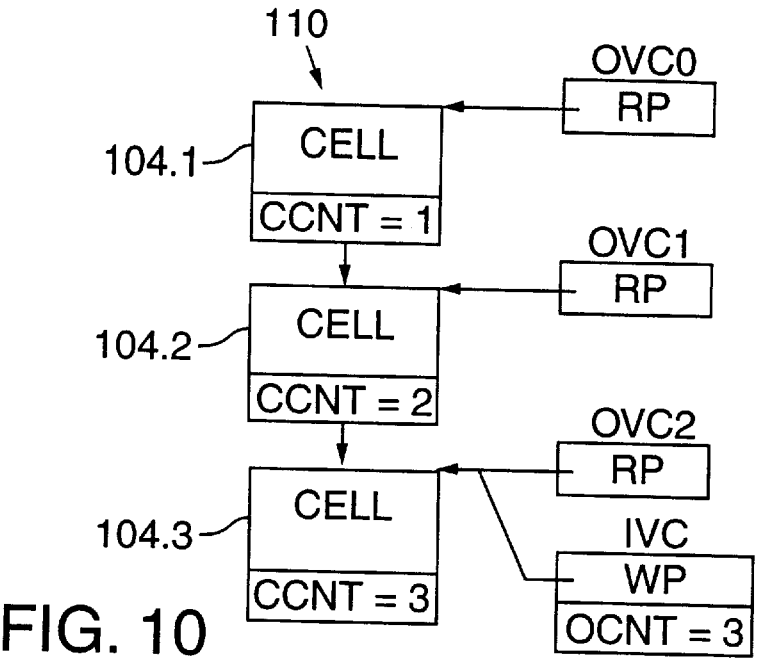

In FIG. 10, OVC2 was added after OVC0 and OVC1. Cells 104.1, 104.2 in queue 110 arrived before addition of OVC2. Their CCNT fields were unchanged when OVC2 was added, and these cells will not be transmitted on OVC2. When OVC2 was added, its RP was invalid. Cell 104.3 is the first cell arriving after the addition of OVC2. Cell 104.3 gets the updated Copy Counter CCNT=3.

Linking the new OVC to the IVC chain and incrementing the IVC's Output Counter OCNT is done as an atomic operation before a new cell (cell 104.3 in FIG. 10) is received.

Figure 11:
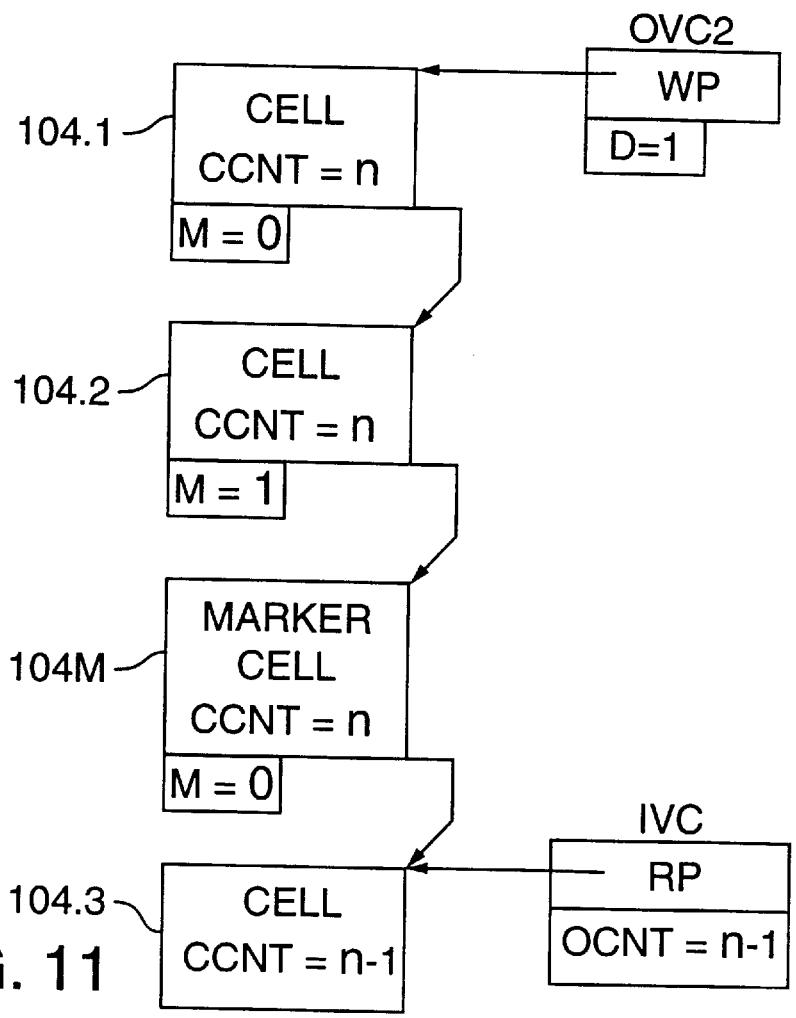

FIG. 11 illustrates removing OVC2 from a multicast connection. When a command to remove OVC2 was received from the CPU, the OVC counter OCNT was n, and cells 104.1, 104.2 had already been received but had not been transmitted by any OVC. These cells will be the last cells transmitted on OVC2 before OVC2 is removed. When a command to remove OVC2 is received, the following actions are taken:

1. In OVC2, the delete bit D (Appendix 3) is set.
2. A "marker" cell 104M is linked to the IVC queue. In the previous cell 104.2, flag M is set (Appendix 1) to indicate that the next cell is a marker cell. Marker cell 104M will not be transmitted by any OVC.
3. In the IVC, OCNT is decremented.

Cell 104.3 is received after the marker cell, and in cell 104.3 CCNT is initialized to the new OCNT value of n−1. In marker cell 104M and preceding cells, CCNT was initialized to the old OCNT value.

When OVC2 reaches the marker cell 104M, OVC2 is removed from the list of active OVCs (step 970 in FIG. 5).

A command to remove more than one OVC is processed similarly.

Frame Based Operation Mode (FBOM)

In this mode, a whole frame of cells from one IVC is transmitted to the destination port or sub-port without any intervening cells from other IVCs or frames. In some embodiments, FBOM is used to multiplex several user ATM connections onto the same ATM connection. Multiplexing can be done even with user interfaces such as AAL-5 which do not require each cell to identify the cell's position in a frame or even the fact that the cell belongs to the frame. The cell's position in a frame, and the fact that the cell belongs to the frame, are known because the cells of a frame are transmitted on an output port or sub-port in the order in which they appear in the frame, with no intervening cells. AAL-5 (ATM Adaptation Layer 5) is described in the following publications incorporated herein by reference: H. Dutton, P. Lenhard, "Asynchronous Transfer Mode (ATM), Technical Overview" (2nd Ed., October 1995); W. A. Flanagan, "ATM User's Guide" (1st Ed., April 1994); O. Kyas, "ATM networks" (1995). In the absence of FBOM, AAL-5 connections are not multiplexed on the same ATM connection.

Figure 12:
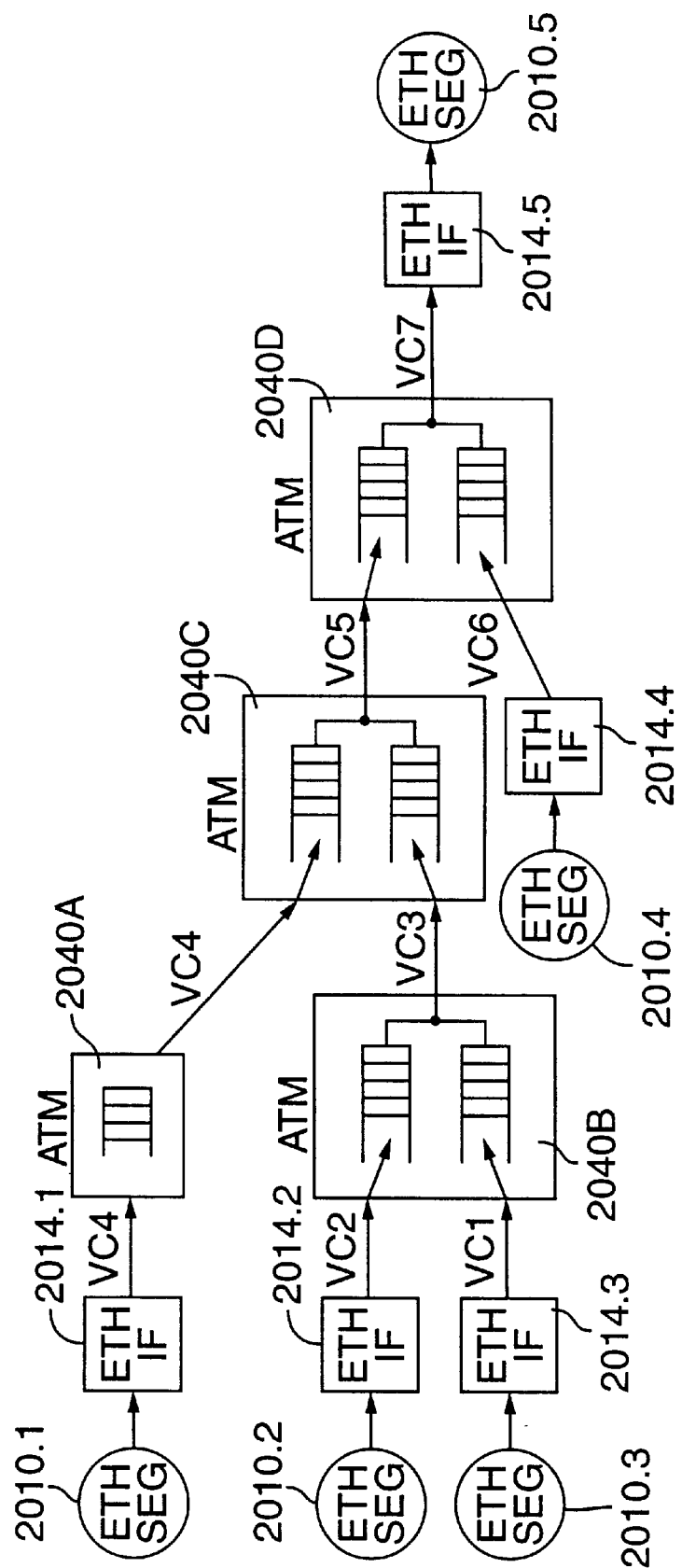
FIG. 12 illustrates Ethernet and ATM networks interacting according to the present invention.

FIG. 12 illustrates multiplexing of different connections onto one ATM connection to interconnect Ethernet segments 2010.1–2010.5 through an ATM network. Traffic from Ethernet segments 2010.1, 2010.2 2010.3, 2010.4 to Ethernet segment 2010.5 is carried as follows. Each segment 2010.1–2010.4 sends Ethernet packets to respective Ethernet Interface circuit 2014.1–2014.4. Each circuit 2014.1–2014.4 converts each Ethernet packet to a frame of one or more ATM cells. Ethernet interface circuit 2014.3 sends its frames to one port of ATM switch 2040B on a virtual connection VC1. Circuit 2014.2 sends its frames to another port of switch 2040B on a virtual connection VC2. Switch 2040B queues the cells from each circuit 2014.3, 2014.2 in a separate queue. Since these cells have the same destination, switch 2040B transmits them on the same virtual connection VC3 to a port of ATM switch 2040C. The cells are transmitted in frame based operations mode, and thus different frames are not intermixed.

Frames from Ethernet interface circuit 2014.1 travel through ATM switch 2040A to a different port of ATM switch 2040C, and arrive to switch 2040C on a different virtual connection VC4. Switch 2040C queues the cells received on connections VC3, VC4 in different queues, but transmits them on the same virtual connection VC5 since the cells in both queues have the same destination. The cells from both queues are transmitted in frame mode, and thus the frames are not intermixed. Virtual connection VC5 is connected to one port of ATM switch 2040D. Virtual connection VC6 from Ethernet interface circuit 2014.4 is connected to a different port of switch 2040D. The cells arriving on connection VC5, VC6 are queued in different queues, but transmitted on the same connection VC7 in frame mode. Ethernet interface circuit 2014.5 receives the cells on connection VC7, reassembles each frame into an Ethernet packet, and transmits the packet to Ethernet segment 2010.5.

Since each frame arrives with no intervening cells from any other frame, the reassembly performed by circuit 2014.5 is a simple task. Further, circuit 2014.5 does not require memory to store partial frames as would be the case if frames arrived intermixed. The cost of circuit 2014.5 is therefore reduced.

In some embodiments, interface circuits 2014 use AAL-5 ATM adaptation layer. FBOM allows different AAL-5 connections and different ATM connections to be multiplexed onto the same ATM connection (for example, VC4, VC3 are multiplexed onto VC5), even though AAL-5 does not insert into each frame any information, such as MID in AAL-3/4, that would indicate the cell's position in a frame or even the fact that the cell belongs to the frame. The number of virtual connections can therefore be reduced even using AAL-5.

The FBOM operation of an ATM switch is similar to the normal-mode operation. However, in some embodiments:

1. When an OVC is added, the OVC starts transmission on a frame boundary.
2. Parties are removed from a multicast connection on a frame boundary. If a request to remove an OVC came when the IVC had a partial frame, the OVC transmits the partial frame; however, the OVC also transmits the marker cell after the partial frame to indicate to the destination that the partial frame should be discarded.

In FBOM, an IVC may be in one of the following two states (FIG. 13), as indicated by the IVC's flag P (Appendix 2):

a. Full Frame/Empty state (P=0).
In this state the IVC queue 110 is empty or consists of one or more full frames.

b. Partial Frame (P=1).
In this state, the last frame in the IVC is not completely received yet.

In normal mode, P is always 0.

Figure 13:
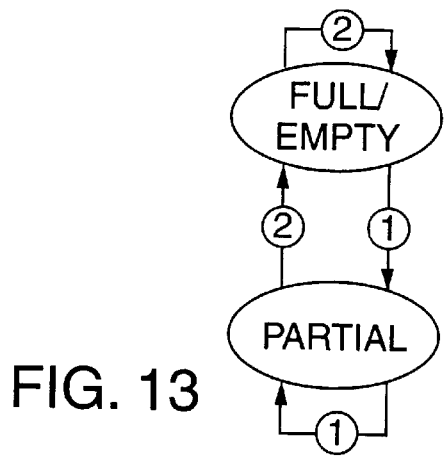
FIG. 13 illustrates a state machine in an ATM switch of the present invention.

In FIG. 13, numbers 1 and 2 (circled) indicate the following conditions:

1. A cell is received which is not the last cell of a frame;
2. The last cell of a frame is received.

Figure 14:
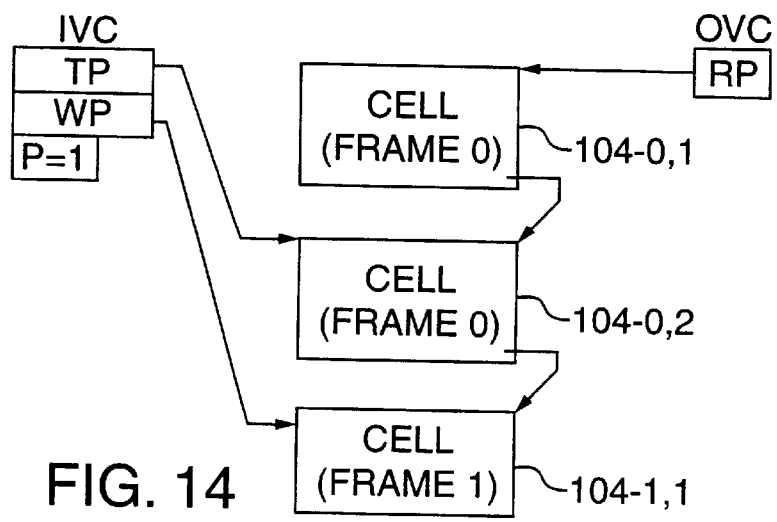
FIG. 14 illustrates data structures in an ATM switch of the present invention.

Each IVC has a Tail Pointer TP (Appendix 2). In FBOM, TP points to the last cell of the last full frame in respective queue 110. Thus, in FIG. 14, cells 104-0,1 and 104-0,2 belong to frame 0; cell 104-1,1 belongs to frame 1. TP points to cell 104-0,2 which is the last cell in frame 0.

In non-FBOM, TP=WP.

When an OVC is selected for output, scheduler 120 will select the same OVC for the OVC's port or sub-port until an entire frame has been transmitted. When the address of the cell being transmitted becomes equal to TP (FIG. 5, step 850), the OVC becomes empty and returns to respective chain 310 (steps 870, 874) waiting for another full frame to be received.

When a new cell is received in FBOM, the flag L (Appendix 1) of the previous cell (if the previous cell exits) is set to a value indicating whether the new cell is the last cell in a frame. See Appendix 6, step 1a. Also, if the respective IVC's chain 310 is not empty, the first OVC in each non-empty chain 310 gets its flag L also set to a value indicating whether the new cell is the last in a frame.

FIG. 3 illustrates operations performed by each PVC 1440 to update an IVC's flags P and pointers TP when a cell is received. Each PVC 1440 keeps a copy of flag P and pointer TP. In FIGS. 3–6, a triangle pointing down means termination. "==" indicates a condition of equality; "=" indicates an assignment (following the syntax of programming language C).

When the connection was set up, both P flags were initialized to 0 (Appendix 4, step 1h). If F=0 (FIG. 3, step 510; each PVC 1440 has a copy of flag F), the following steps are performed:

1. In each PVC 1440, TP gets the cell address (step 520; see also step 2d in Appendix 6).
2. Each PVC 1440 tests its IVC flag C at step 530. If a PVC has no OVCs for the IVC, the PVC's flag C=0 for the IVC (C is set to 0 at the time connection is set up). At step 540, each PVC 1440 tests its IVC flag H (Appendix 2 and Table 4, entry "TP"). Flag H was set to 1 if it was desired to inhibit transition of empty OVCs to the ready state (for example, if an empty OVC's new header was not yet known). If C=1 and H=0, then C is set to 0 (step 550) and chain 310 is moved to background list 410 (step 560). See also step 2e in Appendix 6.

If F=1 at step 510, and the cell's PTI flag L (bit 2) is set (the cell is the last in a frame; step 570), then P is reset (step 580 and Appendix 6, step 2c-1). Step 520 is performed, and steps 530–560 are performed as needed as described above.

If F=1 at step 510, and the cell is not the last in a frame (step 570), and P=0 (step 590), then P is set to 1 (step 610 and Appendix 6, step 2c-2).

In FIGS. 3–6, steps are performed not necessarily in the order shown or described. For example, in some embodiments, step 520 is performed in parallel with steps 530–560. In some embodiments, steps 550 and 560 are performed in parallel.

FIG. 4 illustrates updating the OVC read pointers when a cell is received. In each PVC 1440 (FIG. 25), if the IVC flag C=1 (step 700) and the IVC flag R=0 (step 710) then:

1) the IVC's R is set to 1 (step 720 and Appendix 6, step 3a-1), and
2) RP of the OVC pointed to by CHP is set to point to the cell (step 730 and Appendix 6, step 3a-2).

Figure 15:
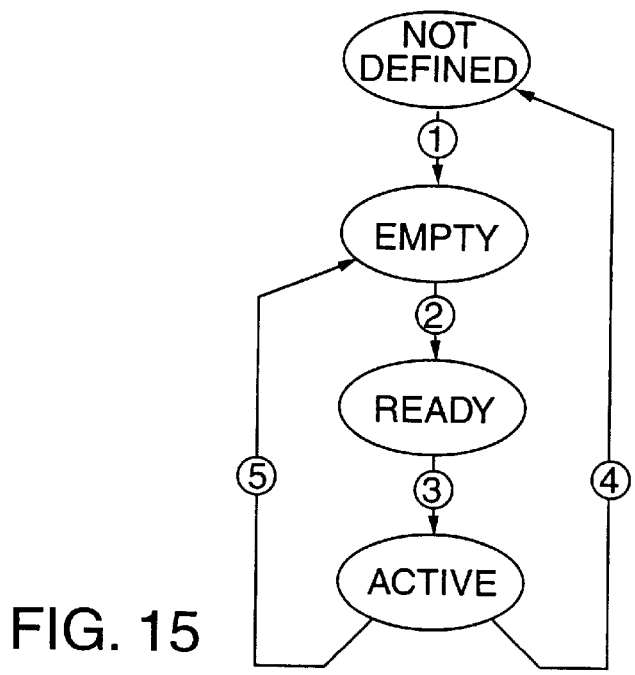
FIG. 15 illustrates a state machine in an ATM switch of the present invention.

At any given time, an OVC structure 220 is in one of four states as shown in FIG. 15. The states are as follows:

Not Defined—the OVC data structure does not belong to any connection. The structure is free to be defined and assigned to an output virtual channel.

Empty—the OVC is defined and linked to its parent IVC in chain 310. However there is no full frame for the OVC to transmit. In a non-FBOM connection, there is no cell for the OVC to transmit.

Ready—the OVC is in list 410 ready to be transferred to scheduler 120. In FBOM, there is at least one full frame for the OVC to transmit. In non-FBOM, there is at least one cell for the IVC to transmit.

Active—the OVC is off the BG list and under scheduler control. Every time the OVC is scheduled for transmission, the OVC emits one cell from the IVC queue.

The state transitions are described in the following Table 1. The first column in Table 1 shows condition numbers, which are circled in FIG. 15.

TABLE 1

| # | from | to | condition |
|---|---|---|---|
| 1 | Not Defined | Empty | OVC is added tp IVC chain by CPU request |
| 2 | Empty | Ready | In FBOM, the last cell of a first full frame has arrived. In normal mode, a new cell has arrived on the IVC. OVC is waiting for background job. |
| 3 | Ready | Active | OVC is transferred to scheduler by background job |
| 4 | Active | Not Defined | OVC is removed by CPU request (after transmission of marker cell) |
| 5 | Active | Empty | the cell with a pointer equal to Tail Pointer has been transmitted on OVC |

When the connection is first set up, the IVC is empty, and therefore both WP and TP are undefined (invalid). In one PVC 1440, the C bit (Chain is Ready) is set (step 1f) since the connection is set up with at least one OVC in chain 310. In that PVC 1440, CHP and CTP point to the OVC (Appendix 4, step 1d). The OVC has a pointer to its parent IVC (step 2b). In the other PVC 1440, flag C is reset. This setup is done when a command "PVC Setup connection" is executed.

When the first cell 104 arrives on the IVC, the IVC Write Pointer is updated to point to the new cell (Appendix 6, step 2a). Then, the OVC Read Pointer is updated to point to the new cell (step 3a-2), and the IVC flag R is set in respective PVC 1440 (step 3a-1).

FIG. 5 illustrates transmitting a cell on an OVC. The operations of FIG. 5 are performed by the PVC 1440 maintaining the OVC, except as made clear otherwise. At step 810, the OVC's fields RP, L, M receive the cell's NXT, L, M. The previous value of the OVC's flag M is saved before step 810, and is tested at step 820. If M=0, the steps performed depend on the value of the OVC flag A (step 830). Flag A is used in FBOM to ensure that the transmission on a new OVC starts on the frame boundary when the OVC is first added. More particularly, when the OVC was first added, flag A was set to 1 or 0 depending on whether the connection was in FBOM and the IVC had a partial frame (Appendix 5, step 2c). If the IVC had a partial frame (P=1), then A was set to 1. In this case, scheduler 120 will not transmit any cells on the OVC until after the OVC's RP passed the last cell in the current frame. Transmission will start with the first cell of the next frame. If P=0 when the OVC was added, A was set to 0.

In normal mode, A is always 0.

If A=0 at step 830 of FIG. 5, the cell is transmitted (step 840). In particular, the PVC 1440 sends the cell address and the VPI/VCI of the cell's new header to SIF 1420 (FIG. 25) for transmission, as shown in the bottom half of FIG. 27. If the cell address is equal to TP (step 850), the OVC becomes empty. If the IVC's P=0 (step 860), then the IVC's R is set to 0 step 870). Otherwise, R is set to 1 (step 874). The OVC is moved to respective chain 310 (step 880).

If A=1 (step 830), the cell is dropped (step 890). This means that the PVC 1440 transmits to SIF 1420 the cell's address and a NULL header (VPI=VCI=0), and hence the cell will not be transmitted. However, the cell's CCNT will be decremented by SIF 1420. If the previous value of OVC's flag L is 1 (step 900; L was saved before step 820), the OVC's flag A is set to 0 (step 910). Step 850 and appropriate ones of steps 860–880 are performed as described above.

If M=1 at step 820, the cell is a marker cell. If the OVC's flag D=0 (step 920), the cell is dropped (step 930). Step 850 and appropriate ones of steps 860–880 are performed as described above.

If D=1 at step 920, the OVC is to be removed. If the IVC's flag F=0 (step 940), the cell is dropped (step 950); otherwise, the cell is transmitted (step 960) with a payload of all zeros and a PTI field indicating the last cell of a frame. This cell is the last cell sent on the OVC. This cell may follow a partial frame. When the destination receives this cell, the destination will discard the partial frame because of a length error (and possibly a CRC error).

The marker cell's CCNT is decremented (by SIF 1420) at step 950 or 960.

At step 970, the OVC is removed.

Add connection

The ability to add a connection on the fly is a valuable feature. Adding a connection is an atomic operation which takes place a short time after the command to add a connection is issued. We do not wait until the entire frame is received when we add a connection.

Figure 16:
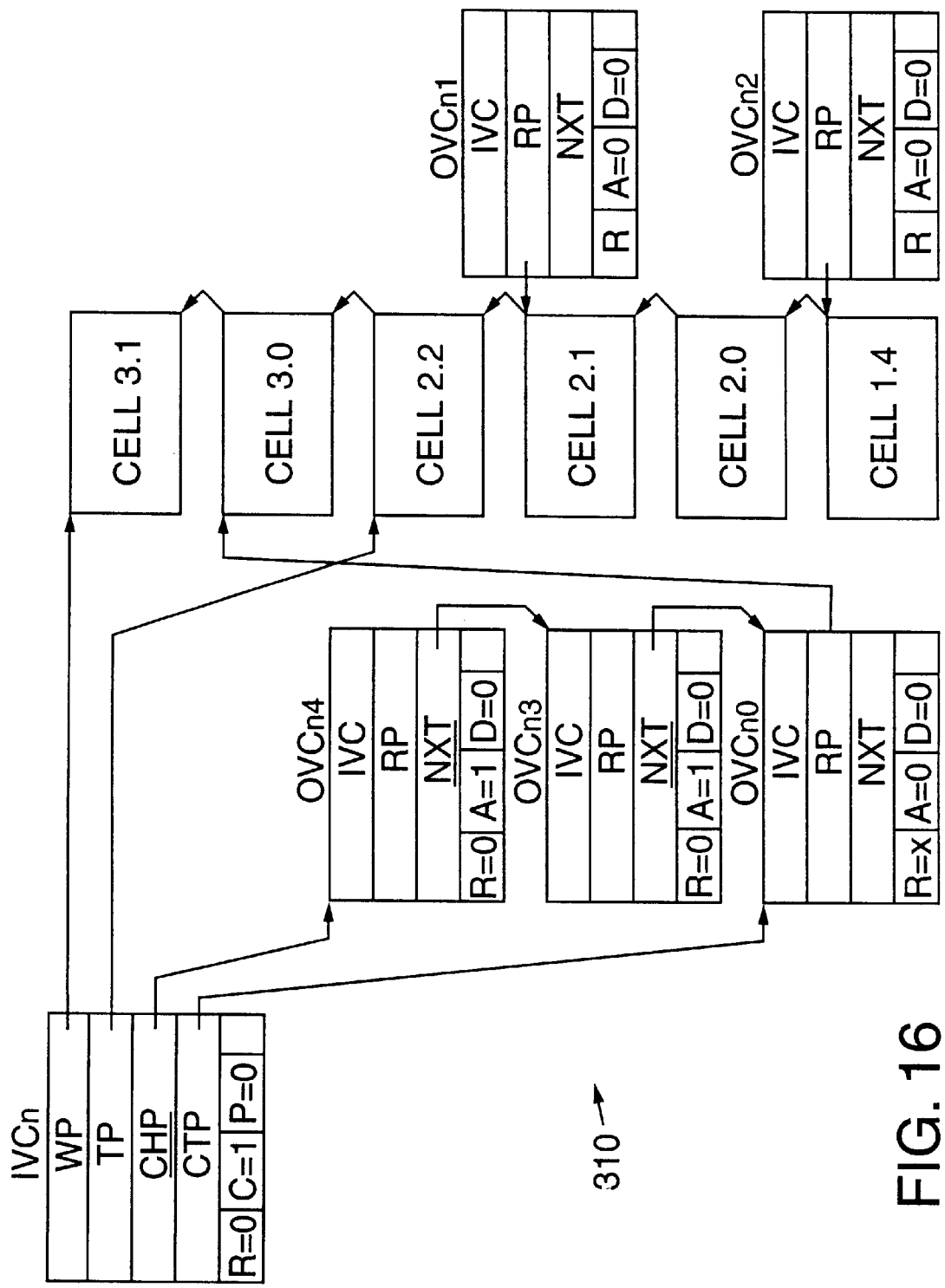
FIGS. 16–19 illustrate data structures at different stages of operation of an ATM switch of the present invention.

In FIG. 16, $OVC_{n3}$ and $OVC_{n4}$ are added, in that order, when the following conditions hold:

1) the IVC queue consists of: a) cell 1.4 of frame 1; b) cells 2.0, 2.1, 2.2 of a full frame 2; and c) cells 3.0, 3.1 of a partial frame 3.

2) $OVC_{n0}$ is empty, waiting for the last cell of frame 3 to arrive. Its Read Pointer points to cell 3.0, which will be the next cell transmitted by this OVC. Thus, even though $OVC_{n0}$ is empty, its RP is valid.

3) $OVC_{n1}$ is active, transmitting frame 2. Its Read Pointer points to cell 2.1, which will be the next cell transmitted by this OVC.

4) $OVC_{n2}$ is active, transmitting frame 1. Its Read Pointer points to cell 1.4.

In FIG. 16, $OVC_{n3}$, $OVC_{v4}$ transmit on ports handled by the same PVC 1440 (FIG. 25), and therefore the two OVCs are added to the same chain 310.

The new OVCs are added at the head of IVC chain 310, and the IVC flag R is reset in respective PVC 1440. The RP fields of $OVC_{n3}$, $OVC_{n4}$ are invalid.

In $OVC_{n3}$ and $OVC_{n4}$ the A bits are set.

Figure 17:
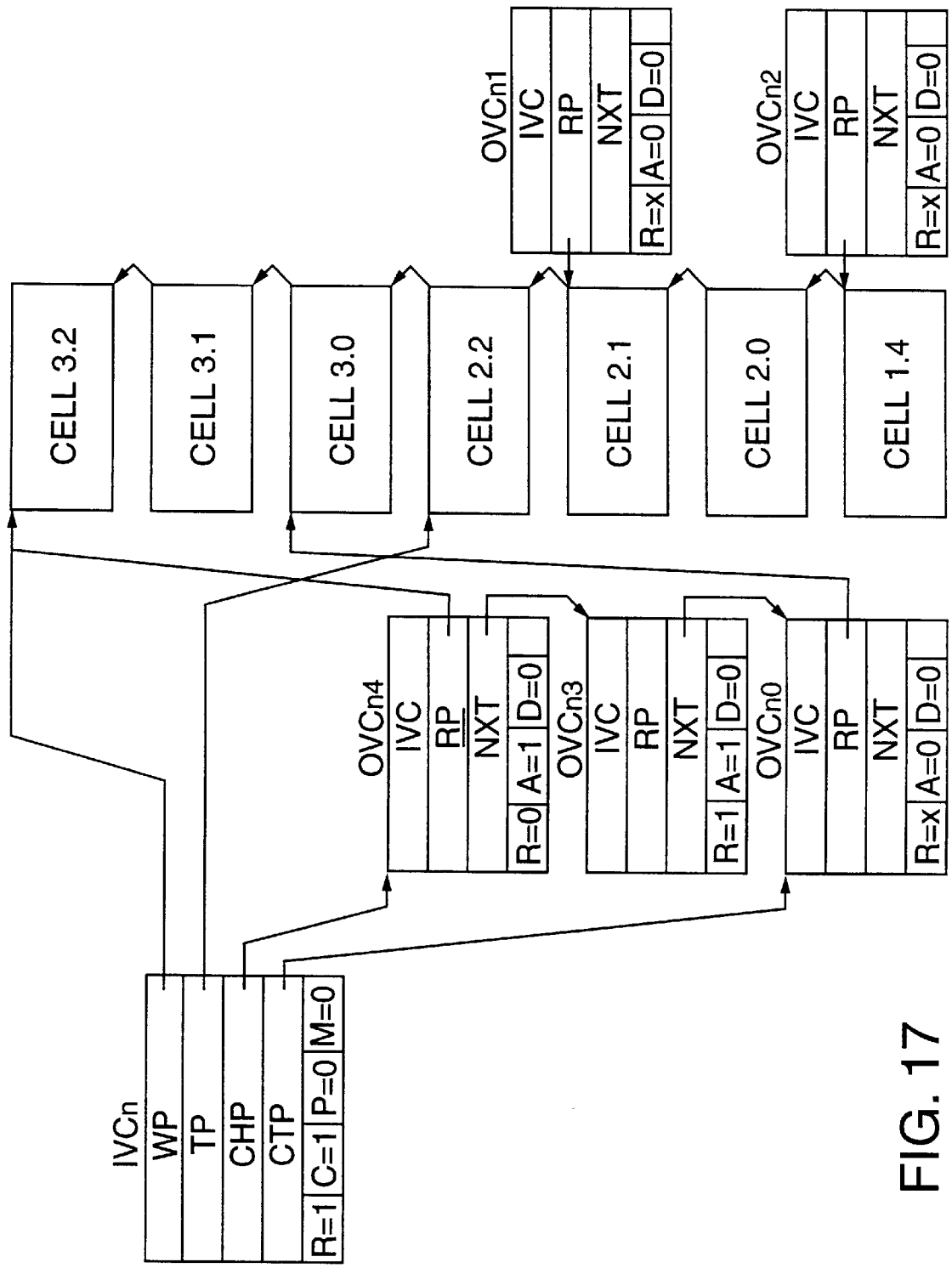

When a new cell 3.2 arrives (FIG. 17), the RP of the head $OVC_{n4}$ of chain 310 is set to point to the new cell, and the IVC's flag R is set in respective PVC 1440.

When the last cell of frame 3 arrives, the Tail Pointer of the IVC in each PVC is set to point to this cell and the entire IVC chain 310 is linked to the background list 410 in the respective PVC 1440. Going through the list, the background job will set the Read Pointer of $OVC_{n3}$ to be equal to the Read Pointer of the $OVC_{n4}$.

Starting with cell 3.2, all the cells will have a copy count CCNT=5 (previous cells have a copy count CCNT initialized to 3).

Drop connection

In order to remove a connection, two steps are taken:

1. The OVC is marked to be dropped (D bit is set in respective PVC 1440).
2. A marker cell is sent by the CPU to be queued in respective queue 110. This marker cell is constructed as a normal cell with a payload of all zeroes and a PTI field indicating the last cell of a frame. The marker cell's payload and PTI field are stored in a memory (not shown) used to store payloads and headers of incoming cells.

Figure 18:
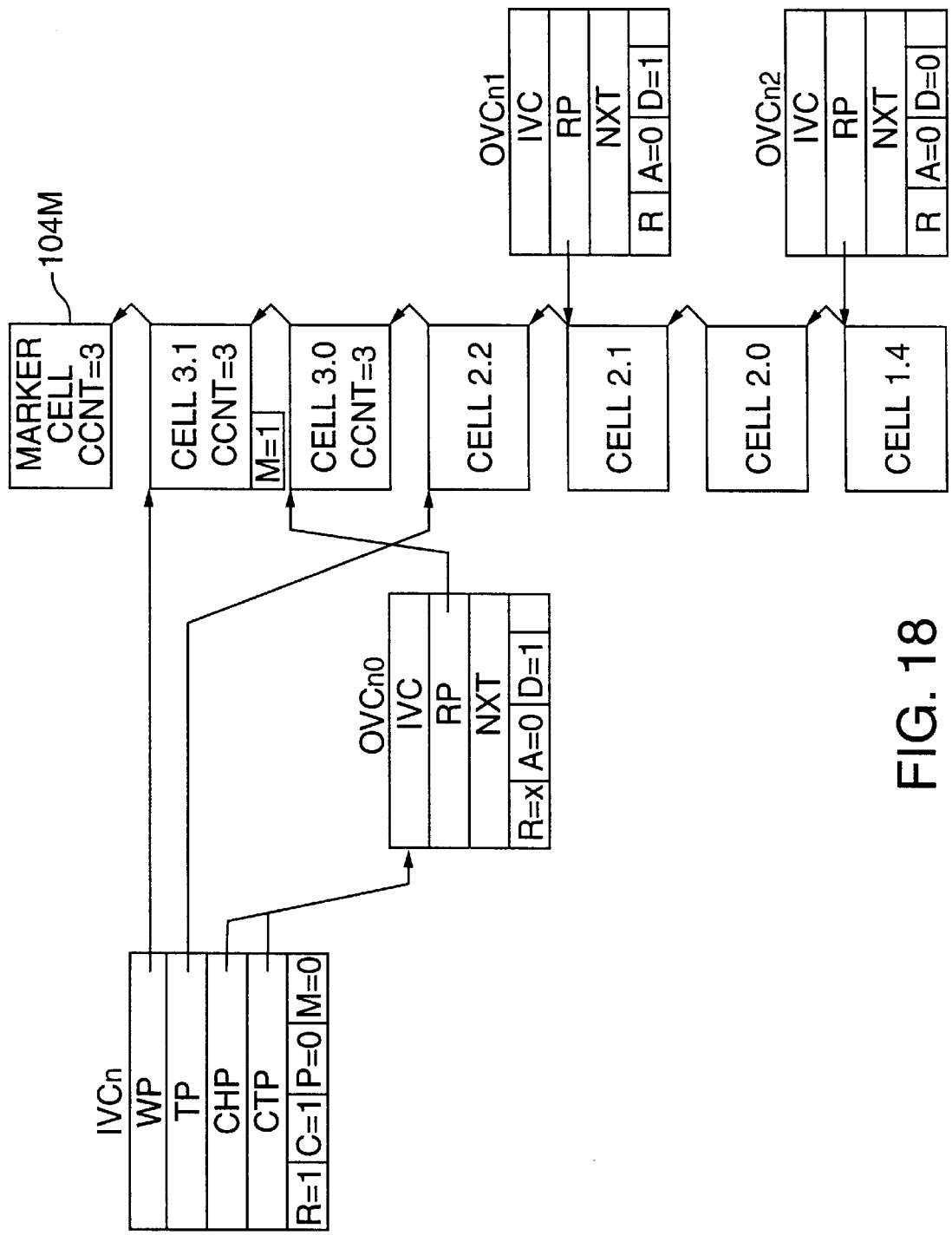

In FIG. 18, $OVC_{n0}$ is empty and waiting for frame 3 to be received. Both $OVC_{n1}$ and $OVC_{n2}$ are active transmitting frames 2 and 1 respectively. The D bits of $OVC_{n1}$ and $OVC_{n0}$ are set, indicating that these OVCs are intended for removal. Marker cell 104M is linked after cell 3.1. The marker cell has its copy count CCNT initialized to 3 as all previous cells. The first non-marker cell (not shown) arriving after the marker cell will have its copy count CCNT=1, i.e. this cell will be transmitted only by one OVC.

If a command to remove $OVC_{n0}$, $OVC_{n1}$ were received after $OVC_{n0}$ had transmitted cell 2.2 but before the first cell 3.0 of frame 3 was received, the marker cell would be queued as the first cell of a partial frame. In particular, the L flag of cell 2.2 and the P flag of the IVC would be reset.

Figure 19:
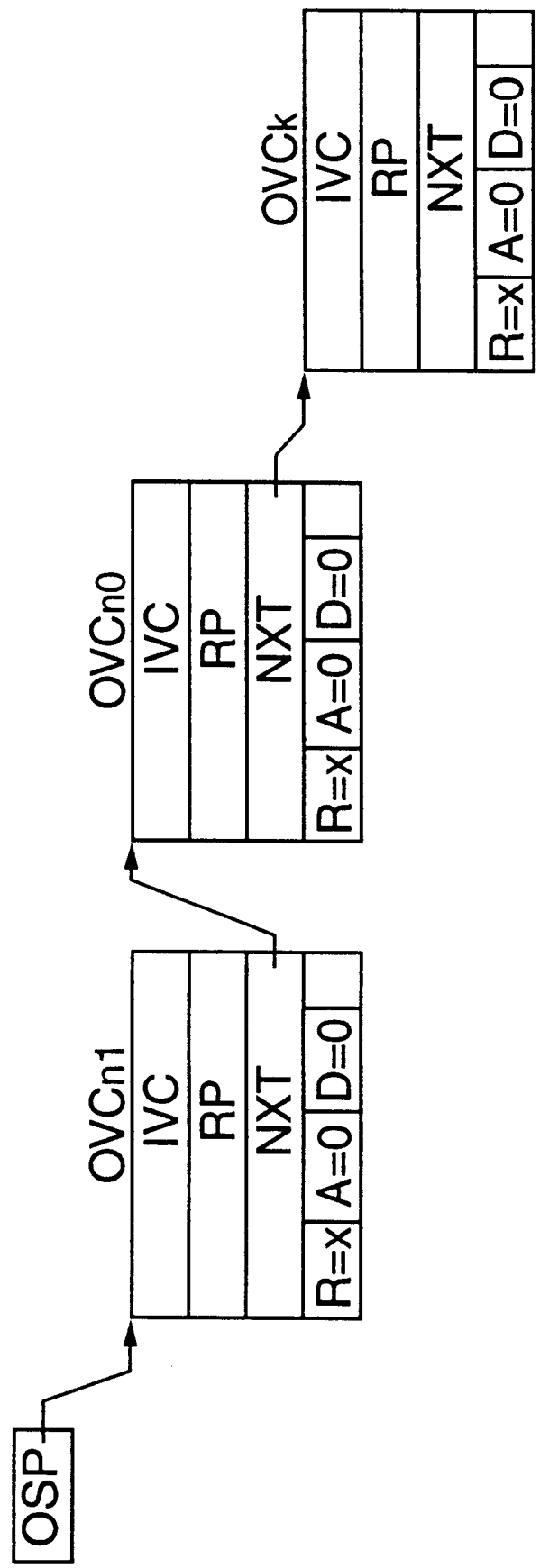

FIG. 19 shows a stack of removed OVC structures in a PVC 1440. Pointer OSP points to the top of this stack. Every time a new OVC is removed (FIG. 5, step 970), it is added at the top of the stack. The last OVC $OVC_k$ in the stack has NXT=0.

When the switch CPU (such as CPU 1414 in FIG. 25) issues a command to remove an OVC, the CPU marks the OVC in the CPU's database as intended for removal. However, some time may elapse before the OVC transmits the market cell and is actually removed and added to the OSP stack. The CPU does not get informed when the OVC is actually removed. The CPU reads the OSP stacks in both PVCs and marks the removed OVCs in the CPU database. When the CPU needs an OVC to add a connection, the CPU gets a new OVC from the CPU's database, and thus the CPU does not need to read the OSP stacks at that point of time. As a result, adding a connection is a fast operation.

To read the stack of FIG. 19, the switch CPU reads the OSP to get the top OVC in the stack. When the CPU reads OSP, OSP is set to zero. Since the CPU has a pointer to the first OVC $OVC_{n1}$, the CPU does not need OSP to traverse the rest of the stack. The end of the stack is detected because in $OVC_k$, NXT=0.

Meanwhile, if an OVC is removed, OSP is set to point to this OVC. Thus, a new stack of removed OVCs is formed. Newly removed OVCs are added to this new stack. When the old stack (the stack of FIG. 19) is used up, the CPU reads OSP to get an OVC from the new stack. This stack management technique has the following benefits: (1) the CPU does not need to read OSP each time the stack is to be popped; (2) zeroing OSP when OSP is read is simpler than setting OSP to point to an OVC in the stack.

Threshold and Packet Discard Function

This function handles congestion in the ATM switch. In particular, this function determines the following thresholds for each queue 110:

1. A marking threshold. If a cell is received on an IVC when ECNT of the IVC exceeds the marking threshold, cells received on the IVC will be transmitted with an overload indication (i.e., with the PTI bit 1 set).
2. A discard threshold (above the marking threshold in some embodiments). If a cell is received when ECNT exceeds the discard threshold, the cell is treated as follows:
   a. In FBOM (or optionally in normal mode with AAL-5), the early packed discard policy (EPD) is used. This means that if the cell is the first cell of a frame, the whole frame is discarded. If the cell is not the first cell in a frame, and a previous cell in the frame was not discarded, the cell is not discarded. The EPD state machine is described below in connection with FIG. 23.
   b. In normal mode, if EPD is not used, the cell is discarded if the CLP field in the cell header is 1. If CLP=0, the cell is not discarded.
3. A queue limit (above the discard threshold in some embodiments). If a cell is received when ECNT exceeds the queue limit, the cell is discarded.

The marking threshold is used as follows. Each IVC structures has a flag I (Appendix 2) indicating whether the EFCI marking is enabled on the IVC (EFCI stands for Explicit Forward Congestion Indication). Each IVC structure has also a forward congestion notification flag N. When a cell is received on the IVC, the following steps are performed by SIF 1420:

1. If the cell's PTI bit 1 (overload indication) is set, then the IVC's flag N becomes set.
2. If the IVC's flag I is set (that is, if EFCI marking is enabled), and the IVC's counter ECNT exceeds the marking threshold, then the IVC's flag N becomes set.
3. In all the other cases, that is, when the cell's PTI bit 1 is reset and either EFCI is disabled or ECNT does not exceed the marking threshold, the flag N becomes reset.

In the output stage, if the IVC's flag N is set when a cell which belongs to the IVC is scheduled for transmission, the cell is transmitted with PTI bit 1 set (that is, with overload indication).

The thresholds vary dynamically depending on the congestion state of the switch. In some embodiments, the thresholds are set as follows. Every Input VC belongs to one of 16 classes, as indicated by the IVC field CLID (class ID; see Appendix 2). CLID is assigned when the connection is set up (Appendix 4, step 1c). In some embodiments, a separate CLID is assigned for each QoS or for a range of QoS parameters. For each class, the ATM switch keeps a Class Counter which is the total number of cells in all the queues 110 of this class. Thus, the class counter is the sum of all ECNT values in the class. When a cell is received, the respective Class Counter is incremented. The counter is decremented when a cell in the class is returned to the stack of free cell buffers after transmission.

Figure 20:
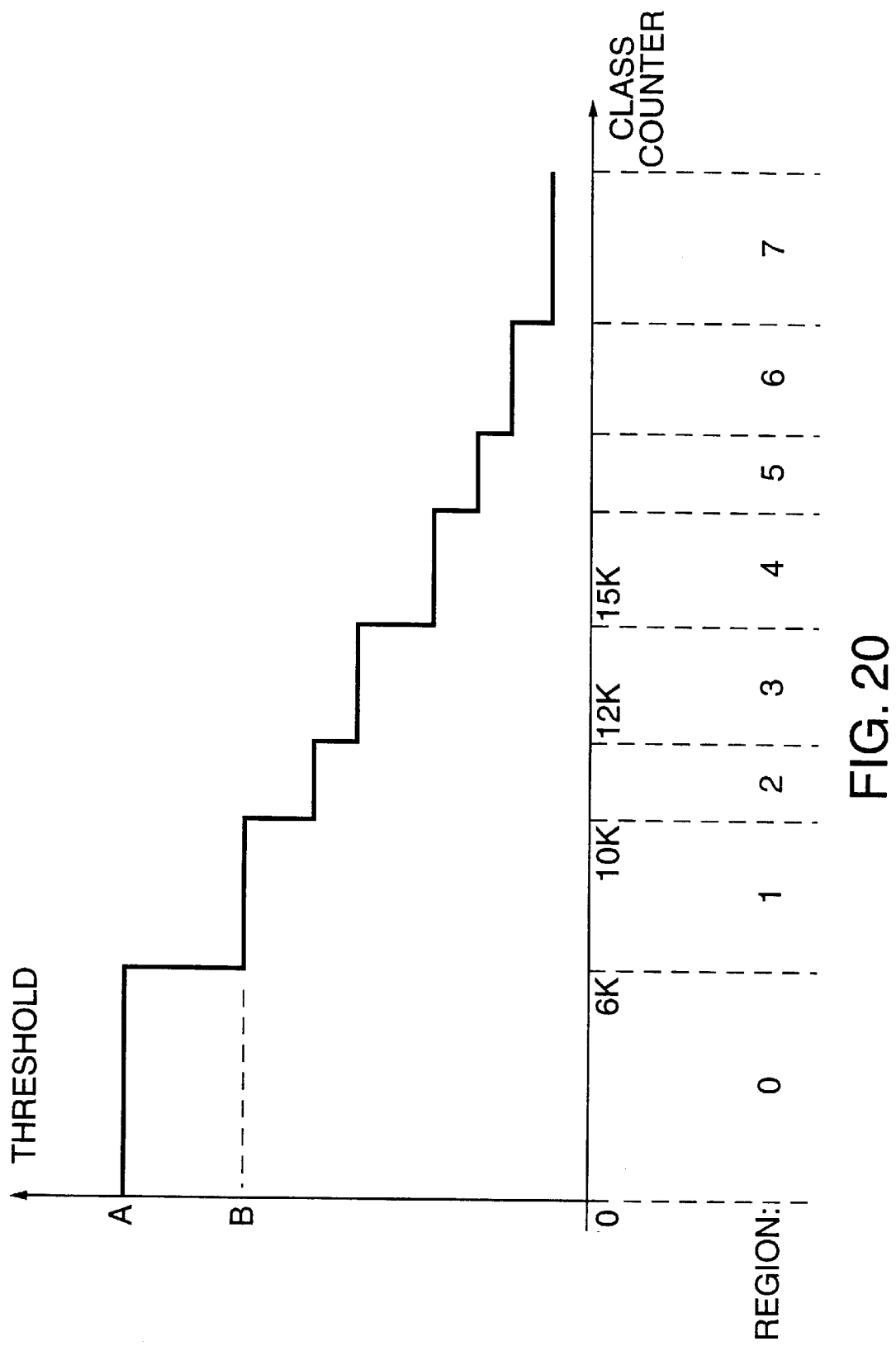
FIGS. 20 and 21 are graphs illustrating the threshold and packet discard function of an ATM switch of the present invention.

The marking, discard, and queue-limit thresholds are set separately for each class. The larger the Class Counter, the lower the actual thresholds for each queue 110 in the class, as shown in FIG. 20. In FIG. 20, the possible values of the Class Counter are subdivided into 8 regions numbered 0 through 7. Each threshold is constant in each region. FIG. 20 is a graph for one threshold. In FIG. 20, region 0 consists of Class Counter values from 0 to 6K (6K=6*1024=7144); region 1 is from 6K to 10K; and so on. The upper limit of region 7 is the "class limit". The region limits are programmable per class, and thus can be different for different classes. In some embodiments, a threshold is the same in two or more neighboring regions.

For each class, the switch maintains a Class Region Id variable indicating in which region the Class Counter is. The actual threshold is determined from the Class Region ID.

When a threshold decreases, the cells that have already been queued are not affected. For example, suppose that in FIG. 20 the class counter increases from region 0 to region 1. The threshold decreases from A to B. However, if a queue 110 in the class had more than B cells when the class counter reached region 1, these cells do not become a subject of any additional congestion reduction action. However, the cells received for the queue after the class counter reached region 1 can be subject to such action until the number of cells in the queue goes down below B (due to cells being transmitted).

Figure 21:
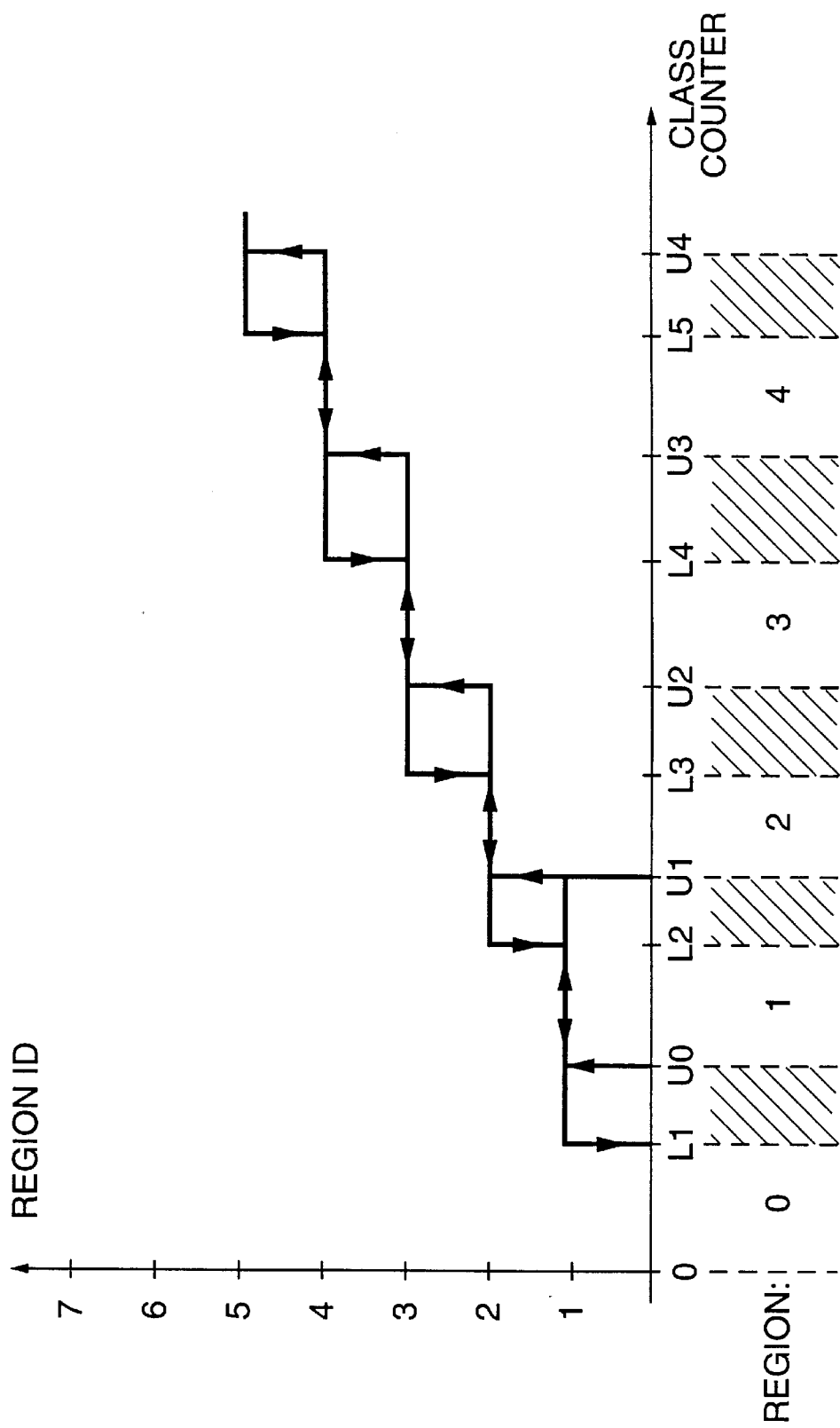

In FIG. 20, the upper limit of each region is equal to the lower limit of the next region. Thus, the upper limit 6K of region 0 is the lower limit of region 1. This is not so in FIG. 21, where neighboring regions overlap. The overlap areas are shown by hatching. The upper limit U0 of region 0 is higher than the lower limit L1 of region 1; the upper limit U1 of region 1 is higher than the lower limit L2 of region 2, and so on. The region ID changes with a hysteresis based on the direction of change of the class counter. For example, when the class counter increases from region 0, the region ID becomes 1 when the class counter reaches U0. When the class counter decreases from region 1, the region ID becomes 0 when the class counter reaches L1. The hysteresis prevents the region ID, and hence the thresholds, from oscillating when the class counter oscillates around a region boundary.

Figure 22:
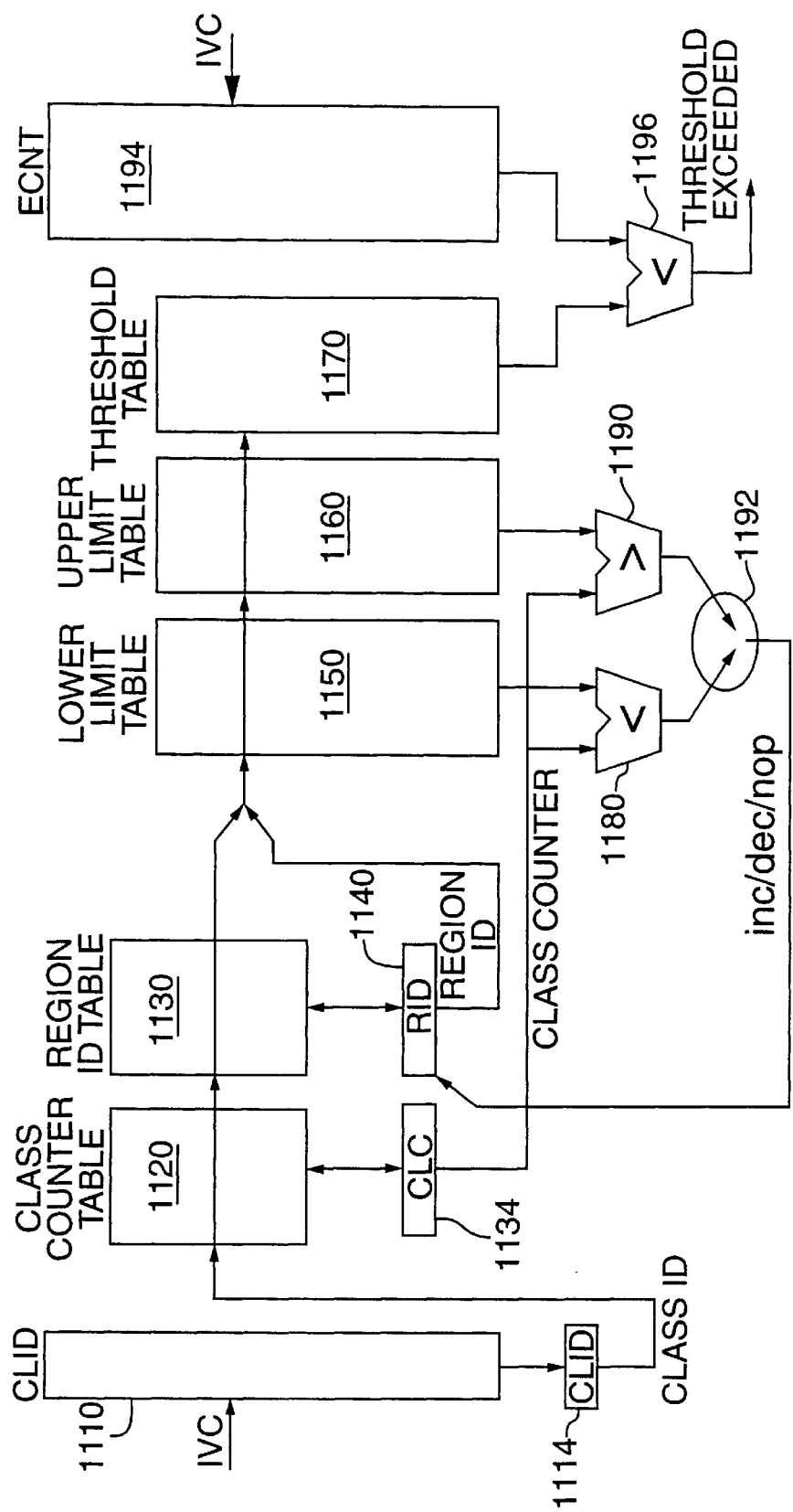
FIG. 22 is a block diagram of a circuit used to implement the threshold and packet discard function of an ATM switch of the present invention.

FIG. 22 illustrates a circuit (part of SIF 1420) used to determine class counters and region IDs. This circuit is invoked every time a cell is received or a cell memory is released. CLID table 1110 stores the CLID fields of IVCs 210. Table 1110 is indexed by the IVC number. The IVC number is shown as "IVC" in FIG. 22. When a cell arrives or is released, its CLID (class ID) is read out of table 1110 to register 1114. The output of register 1114 is connected to inputs of class counter table 1120 and region ID table 1130. Tables 1120 and 1130 are indexed by the class ID. Class counter table 1120 writes the class counter ("CLC") to circuit 1134. Region ID table 1130 writes the region ID ("RID") to circuit 1140.

Circuits 1140 and 1114 provide respectively the region ID and the class ID to lower limit table 1150, upper limit table 1160, and threshold table 1170. Table 1150 provides the lower limit of the region to comparator 1180. Table 1160 provides the upper limit to comparator 1190. Table 1170 provides the marking, discard, and queue limit thresholds to comparator 1196.

The IVC number "IVC" is delivered as an index to table 1194 which stores the ECNT fields of IVC structures 210 (Appendix 2). The output ECNT of table 1194 is provided to comparator 1196. Comparator 1196 compares ECNT with each of the three thresholds from table 1170 and generates signals indicating whether any thresholds are exceeded. These signals are provided to a circuit (not shown; part of SIF 1420) that determines whether the cell is to be discarded, transmitted with an overload indication, or transmitted without an overload indication. That circuit includes circuitry of FIG. 6 and the EPD state machine of FIG. 23, which are described below. That circuit provides a signal to circuit 1134 to indicate whether the cell is received and the class counter should be incremented. Circuit 1134 also receives a signal (not shown) indicating whether the cell is being released from the memory and the class counter should be decremented. Circuit 1134 increments or decrements the class counter accordingly or leaves the class counter unchanged. The new value of the class counter is written back to its slot in table 1120 and is delivered to comparators 1180, 1190.

Each of comparators 1180, 1190 receives signals (not shown) indicating whether the class counter was incremented or decremented by circuit 1134. If the class counter was decremented, and is less than the lower limit, comparator 1180 sends a signal to circuit 1192 that the region ID is to be decremented. If the class counter was incremented and is greater than the upper limit, comparator 1190 sends a signal to circuit 1192 that the region ID is to be incremented. Circuit 1192 signals circuit 1140 whether the region ID is to be incremented or decremented or to remain unchanged. Circuit 1140 changes the region ID if needed and writes it back to table 1130.

Early packet discard (EPD) function

Figure 23:
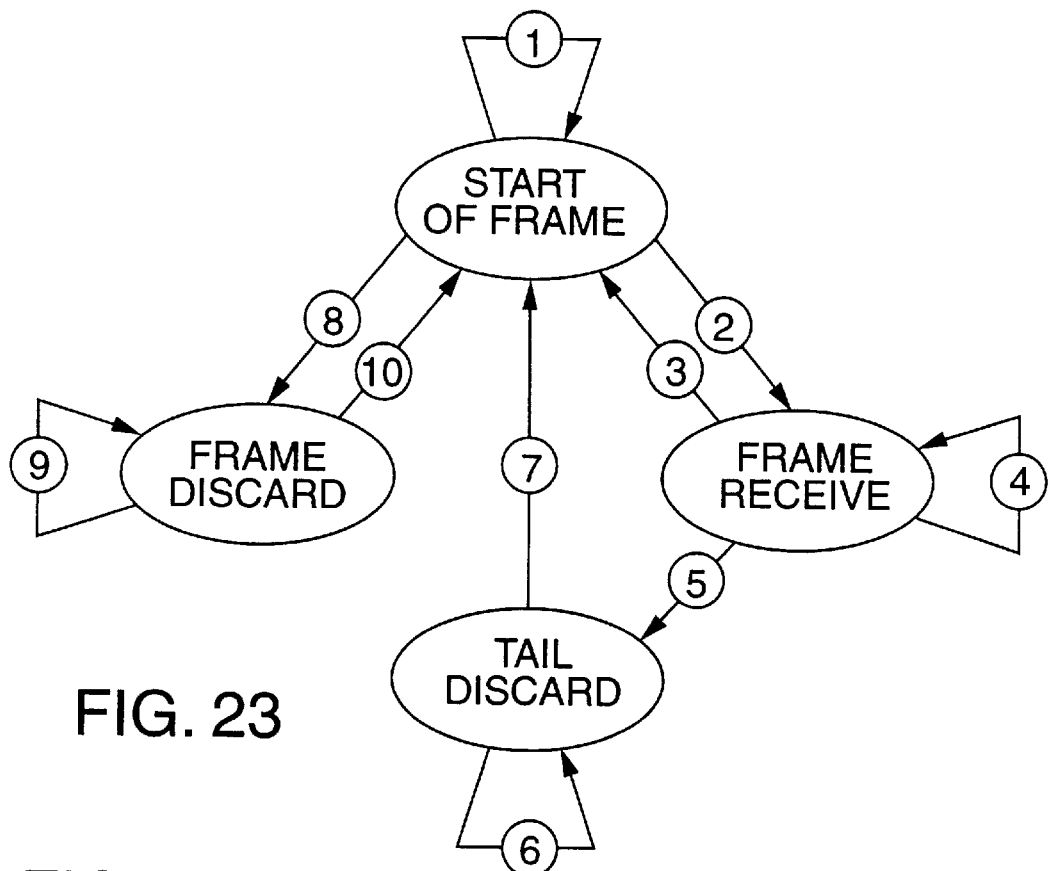
FIG. 23 illustrates a state machine for an early packet discard function in an ATM switch of the present invention.

One EPD state machine of FIG. 23 is provided in SIF 1420 for each Input VC. For normal mode IVCS, EPD can be disabled.

The state transitions are described in the following Table 2. The first column of Table 2 shows condition numbers which are circled in FIG. 23.

TABLE 2

| | from | to | condition | action |
|---|---|---|---|---|
| 1 | Start of Frame | Start of Frame | last cell of a frame arrived | receive if IVC queue is at or below discard threshold, discard otherwise |
| 2 | Start of Frame | Frame Receive | non-last cell arrived and IVC queue at or below discard threshold | receive the cell |
| 3 | Frame Receive | Start of Frame | last cell arrived | receive the cell |
| 4 | Frame Receive | Frame Receive | non-last cell arrived | receive the cell |
| 5 | Frame Receive | Tail Discard | cell was discarded for some reason (e.g. memory full or queue limit is exceeded) | discard the cell |
| 6 | Tail Discard | Tail Discard | non-last cell arrived | discard the cell |
| 7 | Tail Discard | Start of Frame | last cell arrived | receive the cell |
| 8 | Start of Frame | Frame Discard | cell arrives when IVC queue is above discard threshold or cell was discarded for some reason | discard the cell |
| 9 | Frame Discard | Frame Discard | non-last cell arrived | discard the cell |
| 10 | Frame Discard | Start of Frame | last cell arrived | discard the cell |

If the state machine is in the "Tail Discard" state, a partial frame was sent to the destination in "Frame Receive" before transition to "Tail Discard". In a transition from "Tail Discard" to "Start of Frame", the last cell of the frame is sent to the destination to allow the destination to detect the start of the next frame.

The EPD is enabled or disabled on a per-IVC basis.

FIG. 6 shows operations performed to determine if an incoming cell is to be received or discarded. The operations are performed by SIF 1420 unless made clear otherwise. If the switch memory for storing the cells is full (step 1270), the cell is discarded (step 1272). This is done by switch controller (SWC) 1410 (FIG. 25) regardless of any marking, discard or queue-limit threshold. At step 1274, SIF 1420 tests if the cell's class is full, i.e., the class counter exceeds the class limit. If so, the cell is also discarded.

If the corresponding IVC queue is full (step 1276), that is, ECNT is greater than the IVC's queue limit, as determined from the output signals of comparator 1196 (FIG. 22), then the cell is discarded.

If the memory, class and IVC queue are not full, the actions performed depend on the IVC's EPD-enable flag E (Appendix 2). If E=1 (EPD is enabled; see step 1278), the cell is processed as follows.

If the IVC's EPD state machine is in the state "Frame Discard" (step 1280), then the cell is discarded. If the EPD state is "Tail Discard" (step 1282), then: a) if the cell is the last in a frame (step 1283), the cell is received; b) if the cell is not the last in a frame, the cell is discarded. If the EPD state is neither "Frame Discard" nor "Tail Discard", the actions performed depend on whether the IVC queue is almost full (step 1284), that is, whether ECNT exceeds the discard threshold. If the discard threshold is not exceeded, the cell is received. If the discard threshold is exceeded, then the cell is discarded if the EPD state is "Start of Frame" (step 1285), and the cell is received if the EPD state is not "Start of Frame" (i.e., if the EPD state is "Frame Receive").

If at step 1278 the EPD function is disabled, then the cell is received if, and only if: (1) ECNT does not exceed the discard threshold (step 1286), or (2) the CLP bit in the cell's input header is 0 (step 1287).

Switch Architecture

Figure 24:
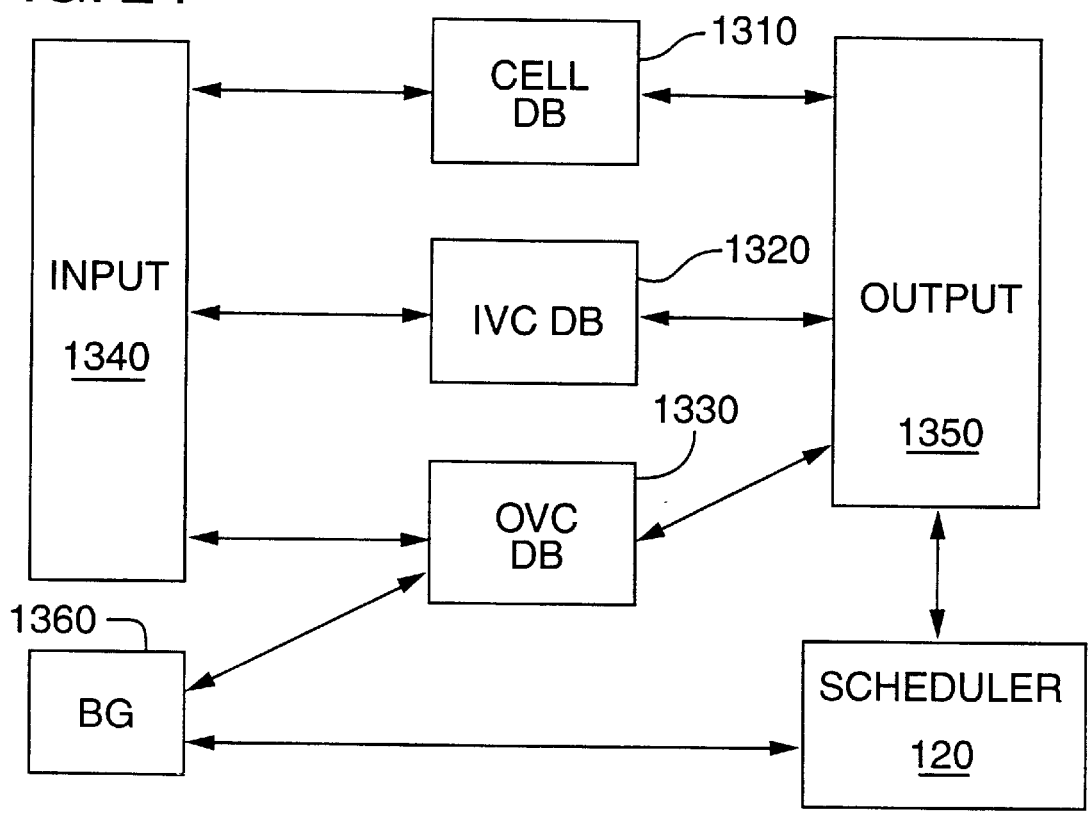
FIG. 24 is a block diagram showing a relationship between function blocks and databases in an ATM switch of the present invention.

FIG. 24 shows the relationship between functional blocks and databases in one embodiment of the ATM switch. Cell database 1310 includes cells 104. IVC database 1320 includes IVC structures 210. OVC database 1330 includes OVC structures 220. The switch circuitry includes input function block 1340, output function block 1350, background (BG) function block 1360, and scheduler function block 120. The relationship between the function blocks and the databases is described in the following Table 3.

TABLE 3

| Function block name | DB | Functions |
|---|---|---|
| Input | Cell DB | Uses cell's NXT field to link cell; sets CCNT = OCNT |
| Input | IVC DB | Uses and updates WP and ECNT; checks against thresholds; reads CHP and CTP |
| Input | OVC DB | Moves IVC chain to BG list using NXT fields; updates RP of the first OVC in the chain |
| BG | OVC DB | Traverses background list using OVCs' NXT fields; sets RPs for OVCs in the list |
| BG | Scheduler | Transfers OVCs which are ready for rescheduling |
| Scheduler | Output | Indicates which OVC to transmit; gets back indication if the OVC is empty and/or port is full |
| Output | Cell DB | Finds the next cell to transmit using cell's NXT field |
| Output | IVC DB | Checks for OVC Empty (compares OVC RP with IVC TP) and moves OVC to IVC chain if the OVC is empty |
| Output | OVC DB | Updates RP; reads NewHdr to generate New Header; reads IVC field to find the parent IVC |

TABLE 3-continued

An ATM switch implementing per-VC queuing and the threshold and early packet discard function is illustrated in FIG. 25. Switch controller (SWC) 1410 is connected to CPU 1414, I/O ports 1418, and SIF (Switch Interface) 1420. SIF 1420 is connected to interconnect bus 1430. Bus 1430 is connected to one or more PVCs (per-VC controllers) 1440. Each PVC 1440 is connected to a respective SCH (scheduler) circuit 1450. Scheduler circuits 1450 are part of scheduler 120 (FIG. 1).

In some embodiments, ports 1418 include 32 input ports and 32 output ports. The switch has two PVCS. One PVC 1440 handles the 16 even output ports, and the other PVC handles the 16 odd output ports.

In some embodiments, each of circuits 1410, 1418, 1420, 1430, 1440 and 1450 is a separate integrated circuit.

Figure 26:
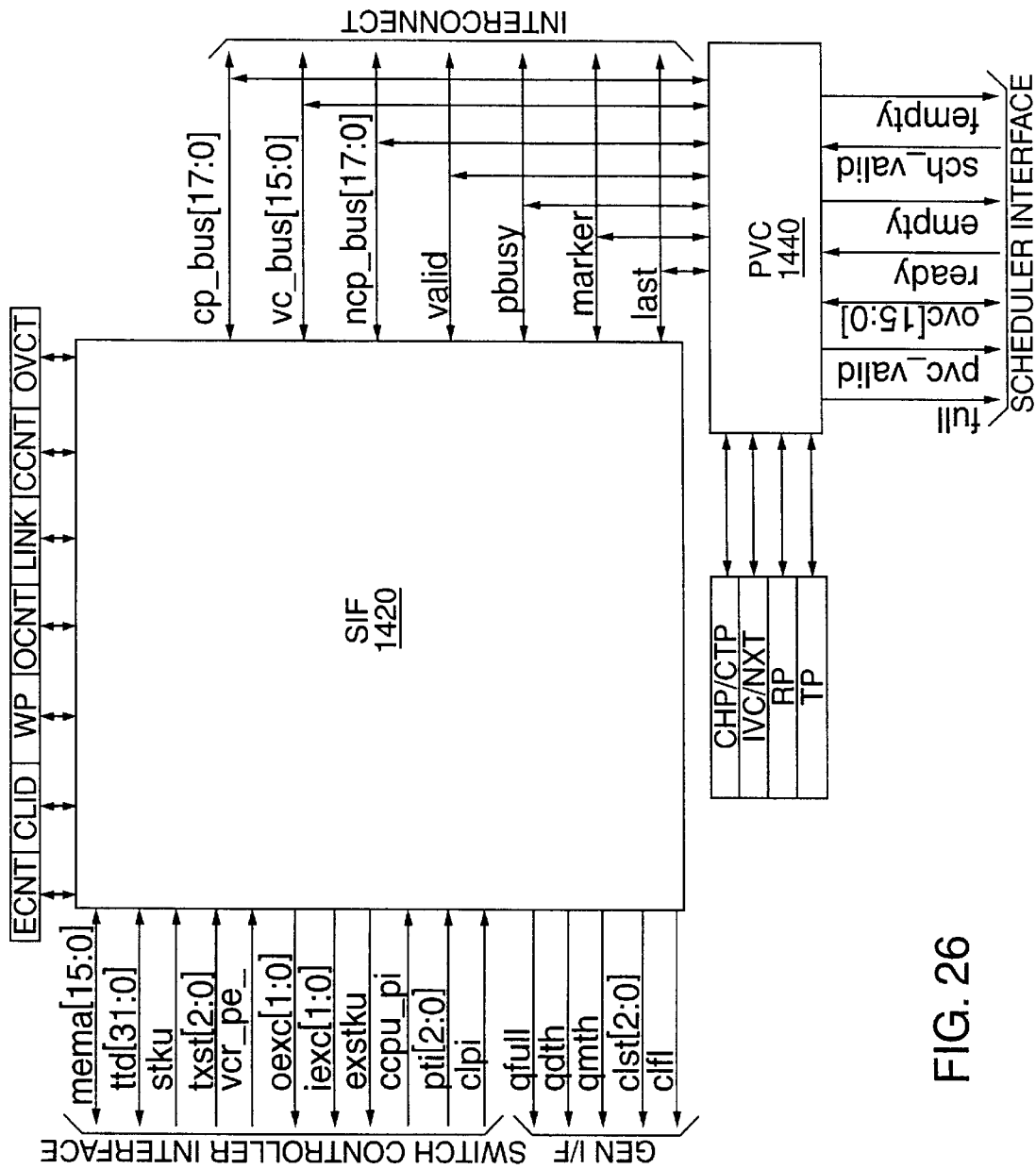
FIG. 26 shows data tables and bus signals in the ATM switch of FIG. 25.

The data structures of Appendices 1–3 are stored in tables as shown in FIG. 26. In particular, SIF 1420 stores the following tables: ECNT, CLID, WP, OCNT, LINK, CCNT, OVCT. Each PVC 1440 stores the tables CHP/CTP, IVC/NXT, RP, TP. These tables are described in Table 4 below.

In each PVC 1440, the RP tables store information only for OVCs corresponding to the output ports handled by the PVC.

Signals of bus 1430 are described in Table 5.

TABLE 4

| Table | Name | Addressed by | Bit # | Function |
|---|---|---|---|---|
| SIF Tables | | | | |
| ECNT | Entry Counter | IVC id | | This table has an entry for each Input VC and it consists of the following: |
| | | | 13:0 | ECNT - Entry Counter (14 bits) |
| | | | 15:14 | EST - EPD State (2 bits) |
| | | | 16 | M - Marker bit |
| | | | 17 | N - Forward Congestion Notification flag |
| CLID | Class Id | IVC id | | This table has an entry for each Input IVC and it consists of the following: |
| | | | 3:0 | CLID - Class ID (4 bits) |
| | | | 4 | E - EPD Enable |
| | | | 5 | I - EFCI Marking Enable |
| WP | IVC Write Pointer | IVC id | | IVC Write Pointer |
| | | | 17:0 | WP - Write Pointer |
| OCNT | Output Count | IVC id | | Number of OVCs connected to this IVC |
| | | | 25:16 | OCNT - Output Count |

TABLE 4-continued

| Table | Name | Addressed by | Bit # | Function |
|---|---|---|---|---|
| LINK | Link Pointers table | Cell Addr | | This table is used to link cells into IVC Queue (entry for each cell) |
| | | | 17:0 | NXT - Link Pointer (to next cell in queue) |
| | | | 18 | L - Next cell is last cell in frame |
| | | | 19 | M - Next cell is marker cell |
| CCNT | Copy Count | Cell Addr | | One entry per cell. Number of copies of the cell to transmit |
| | | | 9:0 | CCNT - Copy Counter |
| OVCT | Output VC Table | OVC id | | The Output VC table has an entry for each OVC and it consists of the following: |
| | | | 43:16 | NewHDR - New Cell Header VPI/VCI |
| | | | 44 | VP - Virtual Path connection flag |
| | | | 15:0 | IVC - parent Input VC for this OVC |
| PVC Tables | | | | |
| CHP/CTP | Chain Head and Tail Pointers | IVC id | | Chain Pointers entry for each IVC |
| | | | 15:0 | CHP - Chain Head Pointer |
| | | | 16 | R - Read Pointer Valid |
| | | | 15:0 | CTP - Chain Tail Pointer |
| IVC/NXT | Input VC and Next OVC field | OVC id | | An entry for each OVC (17 bits) as follows: |
| | | | 15:0 | IVC - parent IVC |
| | | | 16 | D - Delete OVC |
| | | | 17 | A - Add OVC |
| | | | 15:0 | NXT - Next OVC (in chain or BG list) |
| | | | 16 | R - Read Pointer valid (for Next OVC) |
| RP | Read Pointer | OVC id | | An entry for each OVC (16 bits) |
| | | | 17:0 | RP - Read Pointer |
| | | | 18 | L - RP points to last cell in frame |
| | | | 19 | M - RP points to marker cell |
| TP | Tail Pointer | IVC id | | An entry for each IVC. |
| | | | 17:0 | TP - Tail Pointer |
| | | | 18 | C - Chain is Ready |
| | | | 19 | H - Hold |
| | | | 20 | P - Partial Frame |
| | | | 21 | F - Frame mode |

TABLE 5

| Symbol | Width | I/O | Function |
|---|---|---|---|
| Switch Controller Interface | | | |
| MEMA | 16 | I/O | Memory Address During the Input stage, these signals are samples by the SIF. In the Output stage SIF will drive this bus in case when a cell is transmitted from PVC. |
| TTD | 32 | I/O | Translation Table Data In the Input stage this bus is used by SIF to get an IVC identifier (OPT pointer). In the Output stage this bus is driven by the SIF with a New Header information when a cell is transmitted from PVC. This bus is also used to transfer commands to PVC. |
| STKU | 1 | I | Top Of Stack Updated During Input stage this signal indicates that cell is received (i.e. free buffer is taken from stack of free cell buffers). During Output stage this signal indicates that cell is returned to the Stack |
| TXST | 3 | I | Transmit State These three signals indicate the internal decision of which source is selected during the following output cycle: 000—Queue #0 of the port is selected 001—Queue #1 of the port is selected 010—Queue #2 of the port is selected 011—Queue #3 of the port is selected 100—the Multicast Output table entry is selected 101—CPU cell is selected 110—Port Access Command 111—there is no cell to transmit SIF will force its own cell in case when the TXST is 001, 010, 011, or 111. |
| IEXC | 2 | O | Input stage External Control These two signals provide means for external control logic to override decisions of Switch controller during the Input stage, as follows 00—no override 01—don't link to queue 10—not used 11—discard input cell (don't update Top of Stack) |
| OEXC | 2 | O | Output stage External Control These two signals provide means for external control logic to override decisions of Switch controller during the Output stage, as follows 00—no override 01—release MEMA bus 10—reserved 11—release MEMA bus and don't release cell memory to stack of free cell buffers SIF is using OEXC = 11 to force its own cell for transmission. |
| VCR_PE | 1 | I | Valid Cell Received/Port Empty During Input stage this signal means "Valid Cell Received". During Output stage, means "Port Empty" |
| EXSTKU | 1 | O | External Stack Update SIF will set this signal in case when currently transmitted cell should be returned to the stack of free cell buffers |
| CCPU_PI | 1 | I | Cell for CPU/Port Interrupt During Input stage, means Received Cell should be directed to CPU. SIF is using this signal to qualify input cell. |
| PTI | 3 | I | PTI field of received cell's header |
| CLPI | 1 | I | CLP bit of received cell's header |
| General I/F | | | |
| QFULL | 1 | O | Queue Full This signal is asserted when the destination IVC queue is full. |
| QDTH | 1 | O | Queue Discard Threshold This signal is asserted when the destination IVC queue reached its Discard Threshold. |
| QMTH | 1 | O | Queue Marking Threshold This signal is asserted when the |

TABLE 5-continued

| Symbol | Width | I/O | Function |
|---|---|---|---|
| | | | destination IVC queue reached its Marking Threshold. |
| CLST | 3 | O | Class State<br>These signals indicate the Class Region ID when cell is received. |
| CLFL | 1 | O | Class Full<br>This signal indicates that the Class is Full. |
| *Interconnect Bus* | | | |
| CP_BUS | 18 | I/O | Cell Pointer Bus<br>This bus is used to transfer Cell pointer (cell address) to/from PVC. |
| NCP_BUS | 18 | I/O | Next Cell Pointer Bus<br>This bus is used to transfer Next Cell pointer to PVC during the Output stage. Currently not used during the Input stage. |
| VC_BUS | 16 | I/O | VC Bus<br>This bus is used to transfer IVC/OVC id to/from PVC.<br>During the Input stage this bus is driven by SIF and has IVC id. During the Output stage this bus is driven by PVC and has OVC id. |
| VALID | 1 | I/O | Valid Cell flag<br>This bit is used in conjunction with CP BUS to indicate that the cell is valid. |
| PBUSY | 1 | I/O | Port Busy<br>This signal is driven by the SIF during the Output stage. When set, it indicates that Output port is busy, therefore cell was not transmitted. |
| MARKER | 1 | I/O | Cell Marker<br>When driven by the SIF during the Input stage this signal identifies the Marker Cell.<br>During the Output stage this signal is provided by PVC and it instructs the SIF (together with the Last bit) to discard the cell. |
| LAST | 1 | 0 | Last Cell in frame<br>This bit identifies the Last Cell in frame during the input stage.<br>During the output stage it is used in conjunction with Cell Marker bit as follows:<br>ML<br>00—normal (non-marker) cell transmit<br>01—normal cell drop<br>10—Marker Cell transmit<br>11—Marker Cell drop |
| *Scheduler (SCH) Interface* | | | |
| OVC | 16 | I/O | OVC id<br>This bus is used to transfer OVC id between PVC and SCH. |
| PVC_VALID | 1 | 0 | OVC Valid<br>This signal indicates the validity of OVC bus to Scheduler. |
| SCH_VALID | 1 | I | OVC Valid<br>This signal indicates the validity of OVC bus to PVC. |
| EMPTY | 1 | 0 | OVC Empty<br>This signal is a feedback to Scheduler which indicates that OVC is empty after transmitting the last cell. |
| FULL | 1 | 0 | Port Full<br>This signal is asserted when the output port is full and it is not ready to get another cell. |
| READY | 1 | I | Scheduler Interface Ready<br>This signal indicates that the Scheduler is ready to get a new OVC from the PVC. |
| FEMPTY | 1 | O | Last Cell of a Frame |

As indicated in Table 4, each PVC 1440 has CHP and CTP pointers and R, C and H flags for each IVC. Each chain 310 contains the OVCs that transmit on the output ports handled by the respective PVC. When a cell is received, each PVC updates its IVC and OVC fields as described above. TP, P and F have the same values in each PVC 1440.

FIG. 27 illustrates the flow of data between blocks of FIG. 25. SWC 1410 receives and transmits cells on the network via I/O ports 1418. SWC 1410 receives marker cells from CPU 1414. SWC 1410 sends to SIF 1420 the address of the cell in a switch memory (not shown) and the ID of the respective IVC. The IVC ID, also referred to herein as the IVC number, is the same number as stored in OVC 220 (Appendix 3).

SIF 1420 links the cell into the corresponding queue 110, and updates the ECNT counter.

An additional function of SIF 1420, when the connection is being established or an OVC is being added, is to generate the new header NewHdr for the new OVC.

When the cell has just been received, SIF 1420 transmits the cell address and the IVC ID to both PVCs 1440. PVCs 1440 update OVC fields and perform the operations shown in FIGS. 3 and 4 as described above. If an OVC becomes ready when the cell is received, the respective background job sends the OVC ID to respective SCH 1450 (the transfer PVC→SCH). The OVC ID serves as a pointer to the OVC. For those OVCs that were active when the cell was received, the transfer PVC→SCH is not performed.

Each time SCH 1450 schedules a cell on an OVC for transmission, SCH 1450 sends the OVC ID to respective PVC 1440, as shown in the bottom half of FIG. 27. PVC 1440 updates the OVC fields as shown in FIG. 5, and sends the OVC ID and the cell address to SIF 1420. PVC 1440 compares the IVC TP with the cell address (step 850 in FIG. 5) to determine if the OVC becomes empty. If the OVC becomes empty, PVC 1440 signals respective SCH 1450 that the OVC is empty, and links the OVC to respective chain 310.

SIF 1420 removes the cell from respective queue 110 if needed, updates ECNT, and sends the cell address and the new header to switch controller 1410. Controller 1410 transmits the cell on one of ports 1418 or to CPU 1414.

Timing

Figure 28:
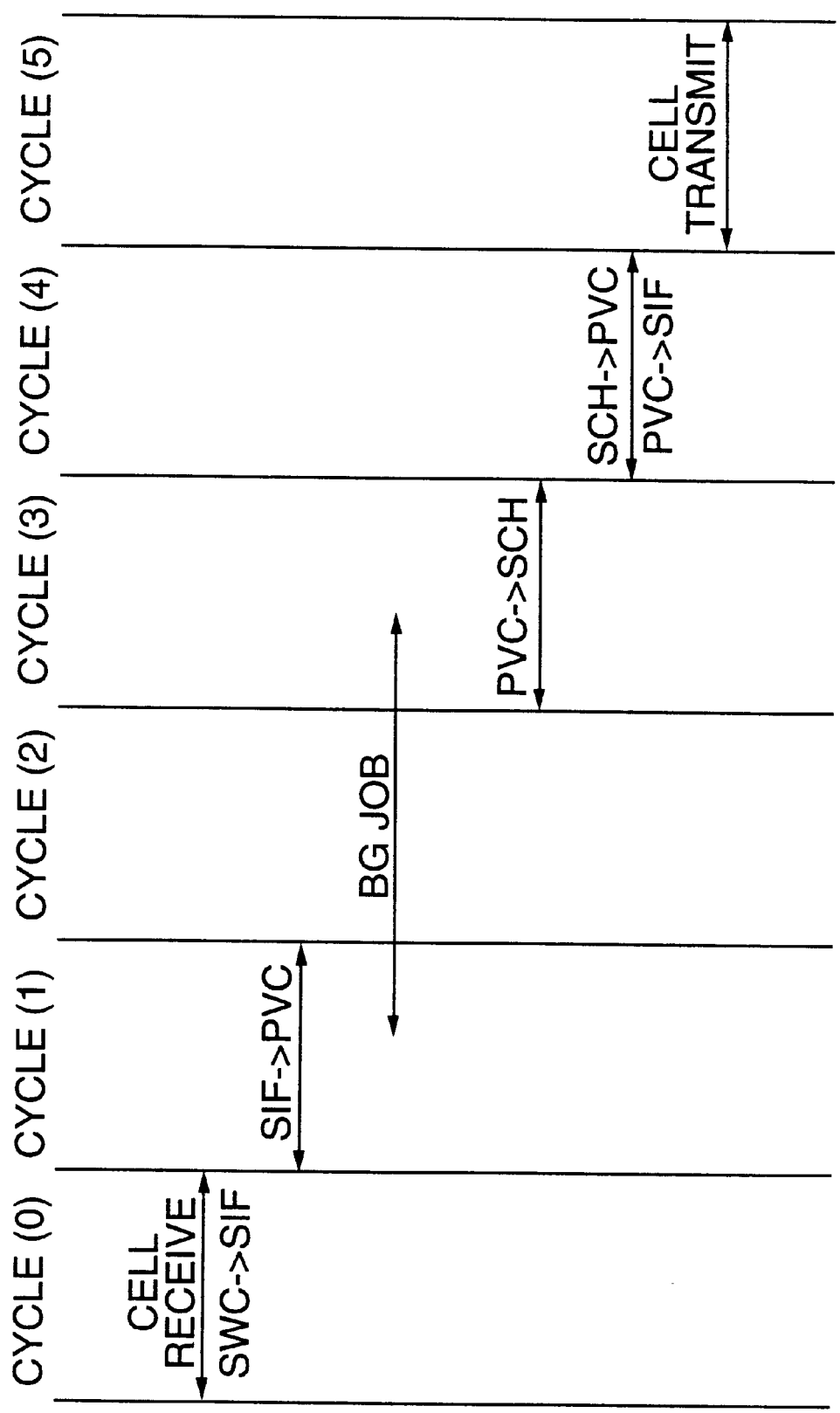
FIG. 28 illustrates operations performed in different switch cycles in the switch of FIG. 25.

The entire operation is performed in several switch cycles as shown in FIG. 28. The background (BG) job may take more than one switch cycle.

Figure 29:
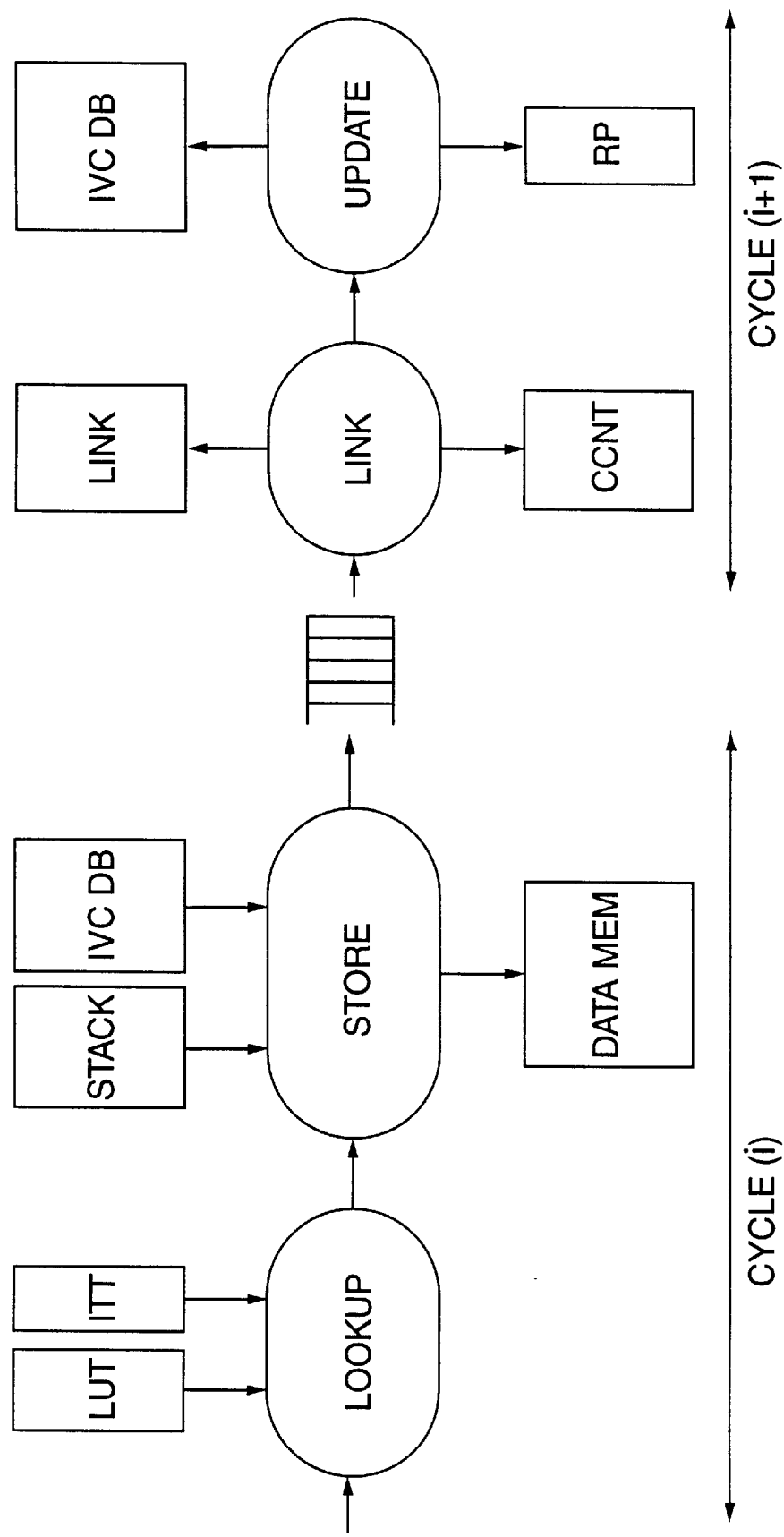
FIG. 29 illustrates operations performed during an input stage of the switch of FIG. 25.

During the input stage the incoming cell goes through several processing stages as shown in FIG. 29. In FIG. 29, LUT and ITT are tables described in U.S. patent application Ser. No. 08/657,835, "Cell Routing in ATM Networks", filed May 31, 1996 by Alex Joffe and hereby incorporated herein by reference.

The function and input/output parameters of each processing stage are described in the following Table 6:

TABLE 6

| Stage | Input | Output | Function |
|---|---|---|---|
| LookUp | Input cell | IVC id | Cell's header lookup |
| Store | Input cell<br>IVC id | IVC id<br>Cell address<br>Cell copy counter<br>(CCNT) | Store the cell in the data memory<br>Update Top of Stack of free cell buffers<br>Read IVC data base [SIF]<br>Check the IVC queue fullness [SIF]<br>Update IVC Write Pointer |

TABLE 6-continued

| Stage | Input | Output | Function |
|---|---|---|---|
| | | | [SIF] |
| Link | IVC id | IVC id | Link cell to IVC queue |
| | Cell address | Cell address | [SIF] |
| | Cell copy counter | | Update the cell copy counter [SIF] |
| Update | IVC id | | Update IVC Tail Pointer & Flags [PVC] |
| | Cell address | | Update OVC Read Pointer and link OVC chain to BG list [PVC] |

Figure 30:
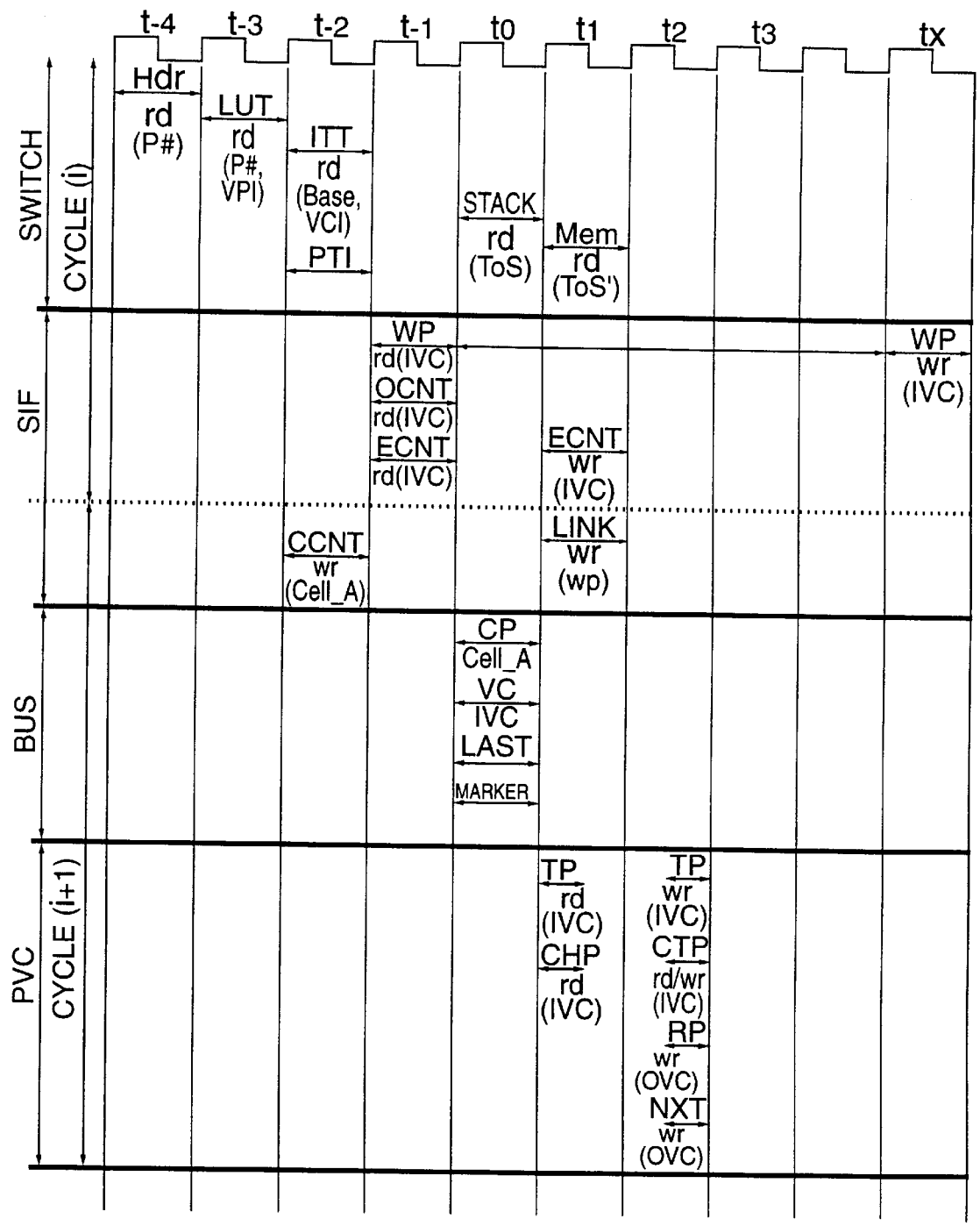
FIG. 30 illustrates an input stage pipeline of the switch of FIG. 25.

The input stage pipeline is shown in FIG. 30. In FIG. 30, "wr" stands for write, and "rd" stands for read.

The Write Pointer (WP) is written back during the output stage of the switch.

Figure 31:
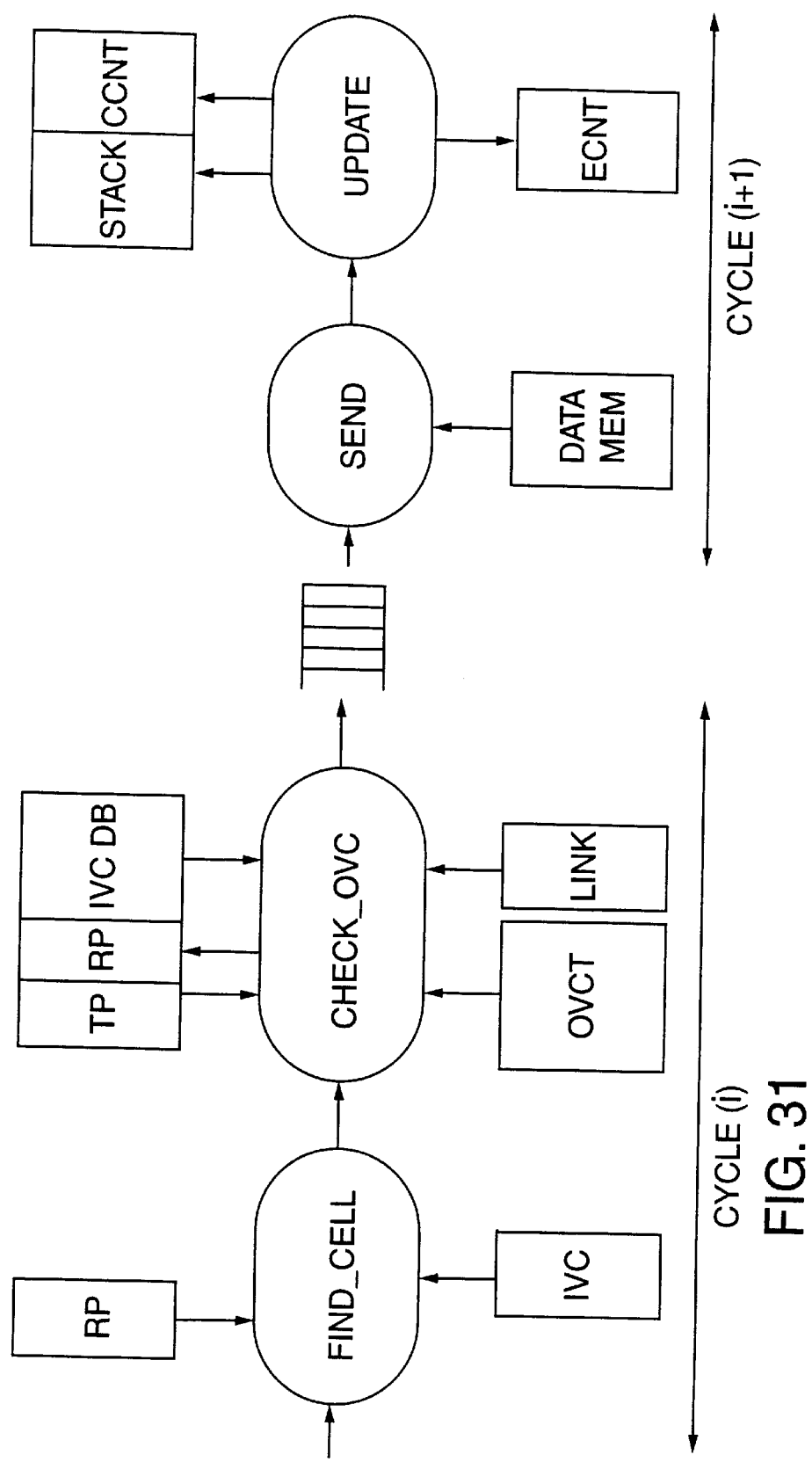
FIG. 31 illustrates operations performed during an output stage of the switch of FIG. 25.

During the output stage the outgoing cell is going through several processing stages as shown in FIG. 31. The function and input/output parameters of each processing stage are described in the following Table 7:

TABLE 7

| Stage | Input | Output | Function |
|---|---|---|---|
| Find Cell | OVC id (from scheduler) | OVC id IVC id Cell address | Find RP and the parent IVC of the given OVC [PVC] |
| Check OVC | OVC id IVC id Cell address | IVC id OVC id Cell address New Header | Compare the cell address to TP [PVC] Link OVC to parent IVC chain if empty [PVC] Find the New Header for the cell [SIF] Update RP [PVC] |
| Send | IVC id OVC id Cell address New Header | IVC id Cell address | Read Cell data Generate New Header |
| Update | IVC id Cell Address | | Update the cell CCNT [SIF] Release cell to stack if the last copy [SIF] Update the IVC ECNT [SIF] |

Figure 32:
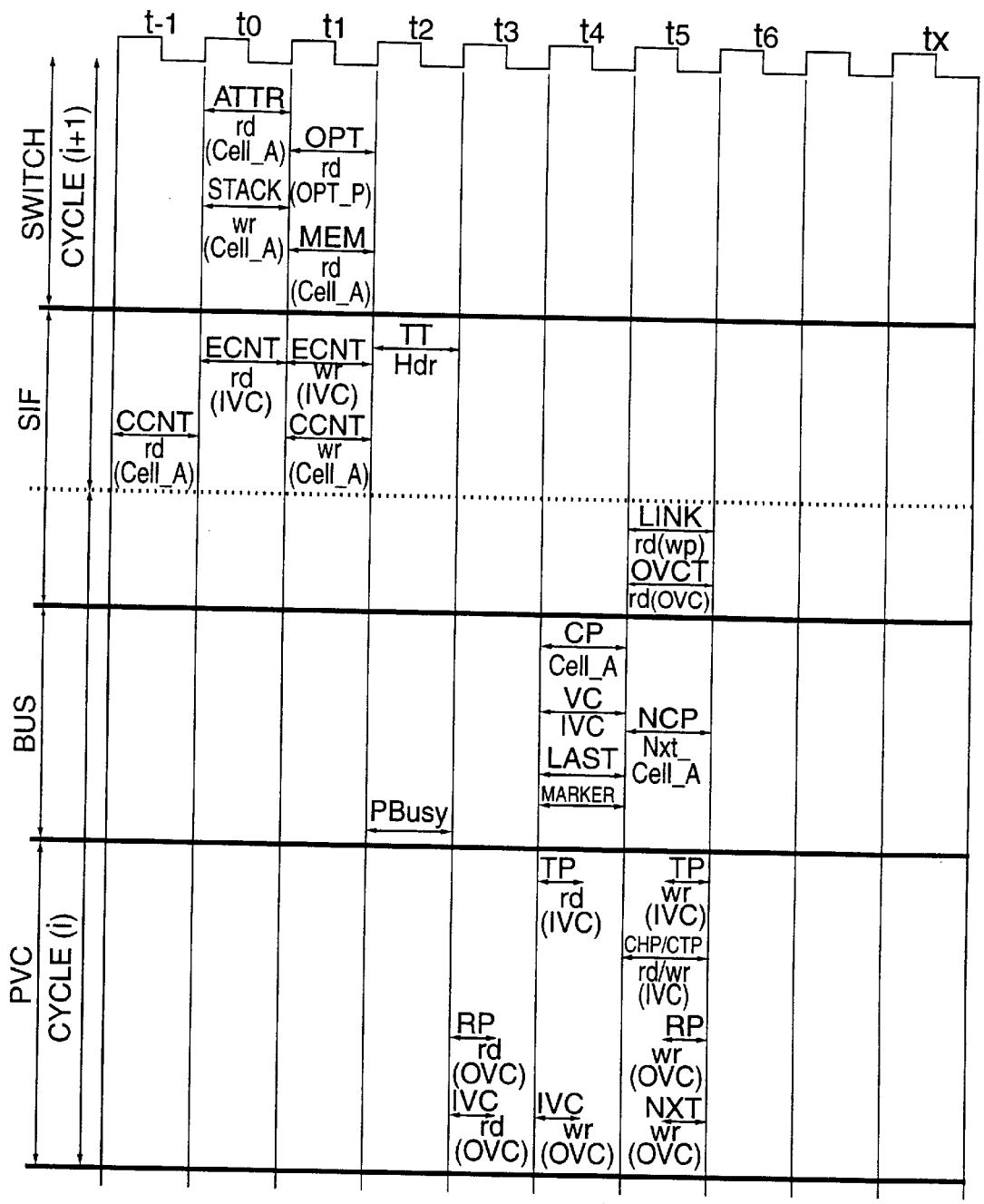
FIG. 32 Illustrates an output stage pipeline of the switch of FIG. 25.

The Output stage pipeline is shown in FIG. 32. ATTR stands for cell attributes (see the aforementioned U.S. patent application Ser. No. 08/657,835). "STACK" is a stack of free cell buffers in a shared memory.

COMMANDS

Write Control Memory operation

Figure 33:
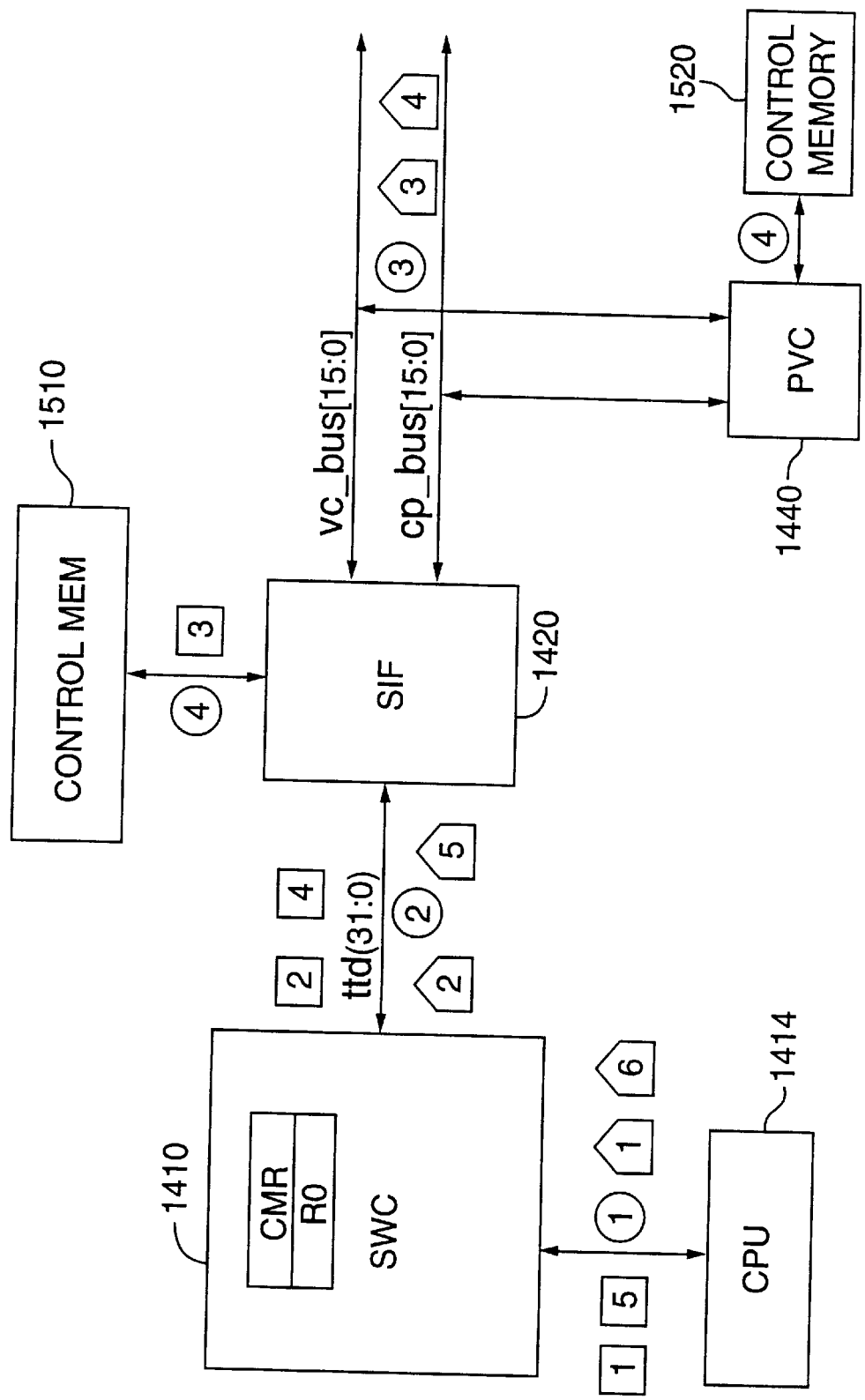
FIG. 33 illustrates flow of data in the switch of FIG. 25.

This operation (FIG. 33) is initiated by CPU 1414 to write data to SIF 1420 or a PVC 1440. Each of SIF 1420 and PVC 1440 has a control memory to store data such as data in the tables of FIG. 26. In FIG. 33, control memories 1510, 1520 of SIF 1420 and a PVC 1440 are shown outside the SIF and PVC for ease of illustrating Write Control Memory operations.

A Write Control Memory operation includes the following steps (the step numbers are circled in FIG. 33):

1. CPU 1414 writes registers R0 and CMR in SWC 1410. These registers specify the command as described below. The command is "Write_Ext_Table_Reg" which is a form of "Access Ext_Table_Reg" with R=0, as described below.

2. SWC 1410 transfers the contents of registers CMR and R0 through bus ttd[31:0] to SIF 1420 during two clock cycles.

3. SIF 1420 transfers the contents of registers CMR and R0 to respective PVC 1440 during two clock cycles using concatenated vc_bus[15:0] and cp_bus[15:0].

4. SIF 1420 and PVC 1440 decode the command and write data to specified locations in their control memories.

Read SIF Control Memory operation

This operation includes the following steps (steps number appear in squares in FIG. 33):

1. CPU 1414 writes registers R0 and CMR in SWC 1410. The command in this case is "Read_Ext_Table_Reg" which is "Access Ext_Table_Reg" with R=1, as described below.

2. SWC 1410 transfers the contents of registers CMR and R0 through bus ttd[31:0] to SIF 1420 during two clock cycles.

3. SIF 1420 reads data from its control memory 1510.

4. The result is transferred to register R0 of SWC 1410.

5. CPU 1414 reads the result from register R0.

Read PVC Control Memory operation

This operation includes the following steps (step numbers are in pentagons in FIG. 33):

1. CPU 1414 writes registers R0 and CMR in SWC 1410. The command in this case is "Read_Ext_Table_Reg" which is "Access Ext_Table_Reg" with R=1, as described below.

2. SWC 1410 transfers the contents of registers CMR and R0 through bus ttd[31:0] to SIF 1420 during two clock cycles.

3. SIF 1420 transfers the contents of register CMR to respective PVC 1440 using concatenated vc_bus[15:0] and cp_bus[15:0].

4. PVC 1440 transfers its result to SIF 1420.

5. The result is transferred from SIF 1420 to register R0 of SWC 1410.

6. CPU 1414 reads the result from register R0.

Setup Connection operation

Figure 34:
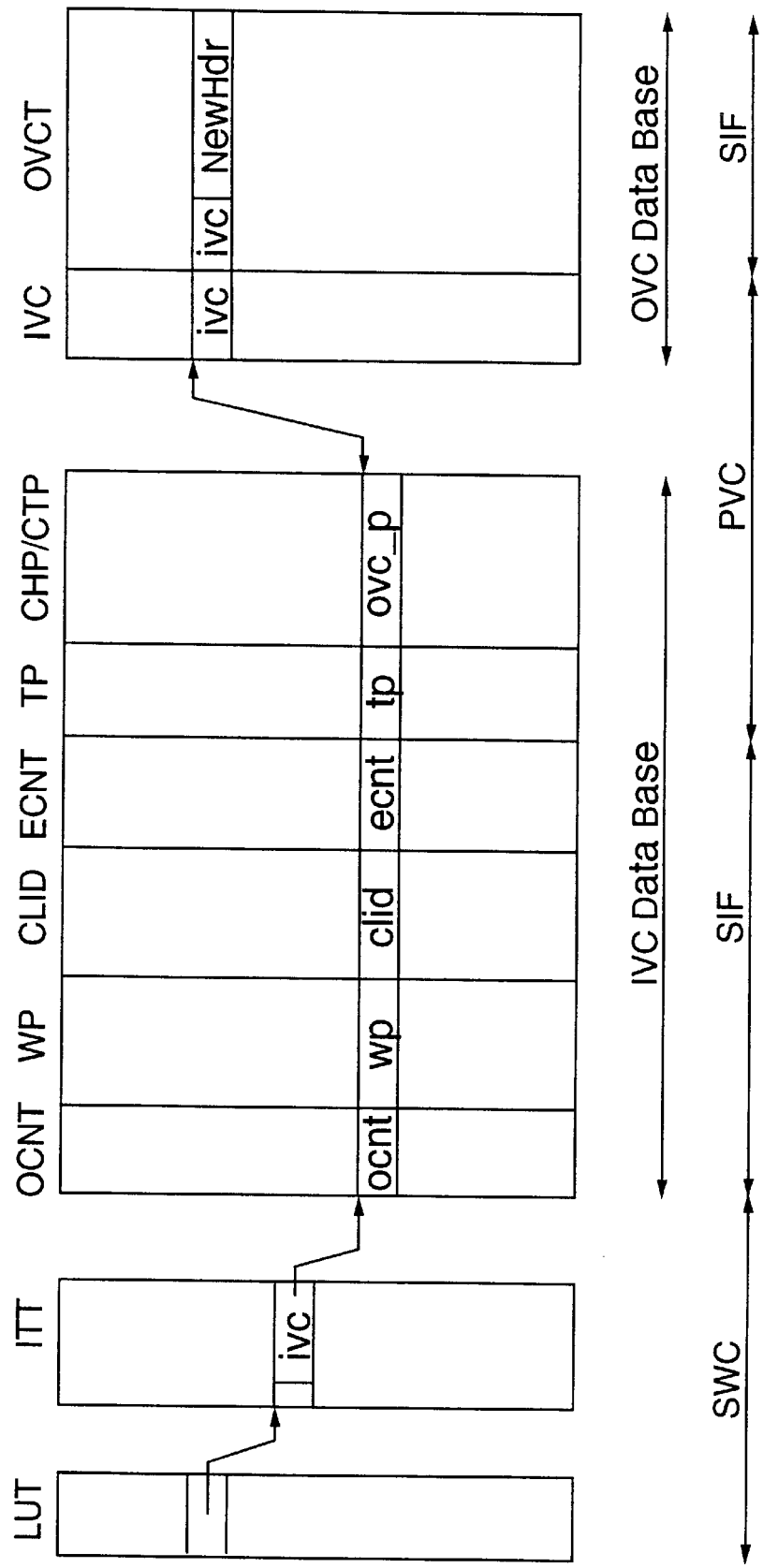
FIG. 34 illustrates programming of the switch of FIG. 25 done to set up a connection.

In order to setup a connection, several parameters are programmed as illustrated in FIG. 34. The values in the PVC and SIF tables after the connection setup are given in the following Table 8 (see also Appendix 4):

TABLE 8

| Table | Field | Value |
|---|---|---|
| Switch Controller | | |
| LUT | CT | = 01, 10, 11 |
| | ITT Base Address | Pointer to ITT block |
| ITT | V - valid | = 1 |
| | S,E,O - OAM flags | depends on OAM processing |
| | FM - FCN mode | = 0 |
| | DM - Discard mode | = 0 |
| | Queue Number | 1011_1111 |
| | M - multicast | IVC[15] |
| | OPT pointer (IVC) | IVC[14:0] |
| SIF | | |
| OCNT | OCNT - output count | = 1 |
| ECNT | ECNT - entry counter | = 0 |
| | EST - EPD State | = 0 ("Start of Frame") |
| | M - marker | = 0 |

TABLE 8-continued

| Table | Field | Value |
|---|---|---|
| | N - Fwrd Cong. Notif. | = 0 |
| CLID | M - marker | = 0 |
| | N - Fwrd Cong. Notific. | = 0 |
| | CLID - class id | = class (0–15) |
| | E - EPD Enable | = appropriate value |
| | I - EFCI Marking En. | = appropriate value |
| WP | WP - Write Pointer | don't care |
| OVCT | IVC | IVC id |
| | VP | VP connection flag |
| | NewHdr | Output Cell Header (VPI/VCI) |
| PVC that handles the output port of the OVC being added (unless mentioned otherwise) | | |
| TP | C - Chain is Ready | = 1 (0 in the other PVC) |
| | R - Read Pointer Valid | = 0 |
| | P - Partial Frame | = 0 in both PVCs |
| | H - Hold | appropriate value (in both PVCS) |
| | F - Frame mode | appropriate value (in both PVCs) |
| | TP - tail pointer | don't care |
| CHP/CTP | CHP | = OVC id |
| | CTP | = OVC id |
| RP | RP | don't care |
| | M | don't care |
| | L | don't care |
| IVC/NXT | A - Add OVC | = 0 |
| | D - Delete OVC | = 0 |
| | IVC | IVC id |
| | R - Read Pointer Valid | don't care |
| | NXT | don't care |

The connection is set up using the following steps:

Step 1: Setup the New Header by using the "Write_Ext_Table_Reg" command.

Step 2: issue the "PVC Setup Connection" command (described below).

Step 3: Issue the switch controller "Setup Connection" command described in "ATMS2003B Switch Controller 1 'WHITE'" (MMC Networks, Inc. of California, document MMC 95-0003, 1995), incorporated herein by reference, at page 18.

Add Connection

In order to add a party to a multicast connection, the following parameters are set:

TABLE 9

| Table | Field | Value |
|---|---|---|
| SIF | | |
| OCNT | OCNT - output count | = Current count + 1 |
| OVCT | IVC | IVC id |
| | VP | VP connection flag |
| | NewHdr | Output Cell Header |
| PVC handling the OVC's output port | | |
| TP | C - Chain Valid bit | = 1 |
| CHP/CTP | CHP | OVC |
| CHP/CTP | CTP | if (prev C ==0) OVC else don't touch |
| IVC/NXT | A - Add OVC | = 1 (note) |
| | D - Delete OVC | = 0 |
| | IVC | IVC id |
| | R - Read Pointer Valid | don't care |
| | NXT | prev CHP |

Note - the A bit is 0 if P is 0.

The connection is added in the following two steps:

Step 1: Setup the New Header by using the "Write_Ext_Table_Reg" command.

Step 2: Issue the "PVC Add Connection" command.

Command Format

This section describes the SWC registers CMR and R0 for different commands.

Access Ext_Table_Reg

Figure 35:
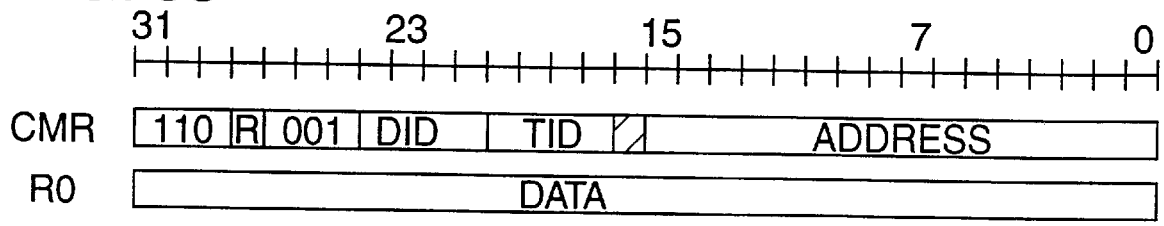

See FIG. 35. In FIG. 35, R=1 for Read, R=0 for Write. DID (Device ID) is given in Table 10 below. TID (Table ID) is given in Table 11 below.

TABLE 10

| DID (Device ID) | SIF |
|---|---|
| 0ii0 (ii = PVC id) | PVC Even (PVC handling even output ports) |
| 0ii1 | PVC Odd |
| 1000 | SIF |
| other | Reserved |

TABLE 11

| TID (Table ID) | SIF | PVC |
|---|---|---|
| 0000 | CCNT | TP |
| 1000 | CCNT above 128 K | Reserved |
| 0001 | LINK | RP |
| 1001 | LINK above 128 K | Reserved |
| 0010 | WP | CTP |
| 0011 | NewHdr (OVCT) | CHP |
| 0100 | IVC (OVCT) | Reserved |
| 0101 | CLID | Reserved |
| 0110 | ECNT | IVC |
| 0111 | OCNT | NXT |
| 1010–1110 | Reserved | Reserved |
| 1111 | Internal Regs | Internal Regs |

In FIG. 35, "Address" is the address in a table or internal registers being read or written. "Data" is data being written.

Figure 36:
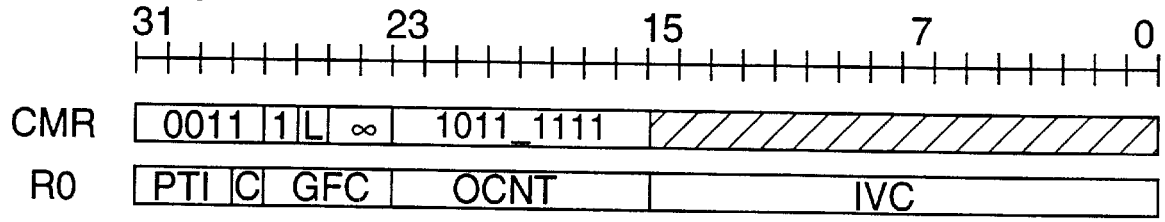

Queue Marker Cell (FIG. 36)

This command is used in a Remove Connection operation. It is similar to a Queue Cell command described in "ATMS2003B Switch Controller 1 'WHITE'" (cited above), at page 19.

In FIG. 36:

| IVC | IVC id |
|---|---|
| OCNT | New Output Cell Count |

Bits CMR[25] and CMR [24] store OCNT [9] and OCNT [8].

| PTI | PTI field of the cell's header (should be last cell in frame, i.e. PTI bit 1 should be set. |
|---|---|
| L | Last Cell Should be set if Marker cell is intended to be the last cell in the IVC Queue. |
| C | CLP bit |
| GFC | GFC field of the cell's header |

Figure 37:
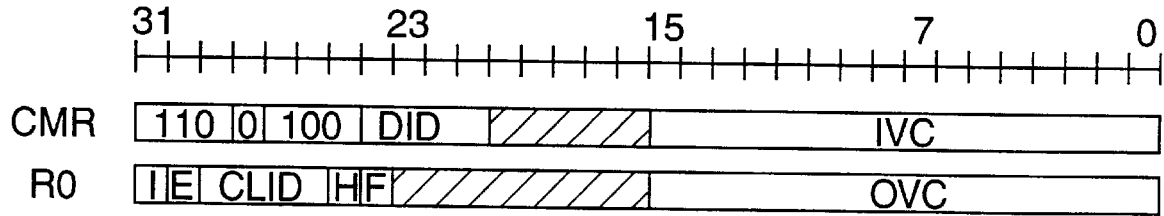

PVC Setup Connection (FIG. 37):

| | |
|---|---|
| IVC | IVC id |
| OVC | OVC id |
| F | Frame Mode |
| H | Hold control bit |
| E | EPD Enable |
| I | EFCI Enable |
| CLID | Class Id |
| DID | Device ID. See Table 10 above. |

Figure 38:
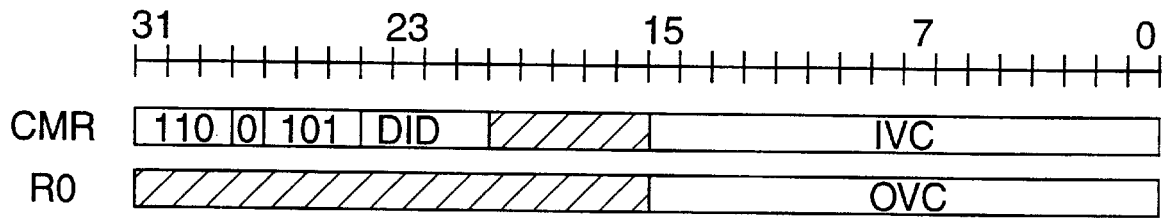

PVC Add Connection (FIG. 38):

| | |
|---|---|
| IVC | IVC id |
| OVC | OVC id |
| DID | Device ID as in Table 10 above. |

PROGRAMMING MODEL

Tables

The SIF table format is shown in FIG. 39. The PVC table format is shown in FIG. 40.

SIF Internal Registers

Figure 41:
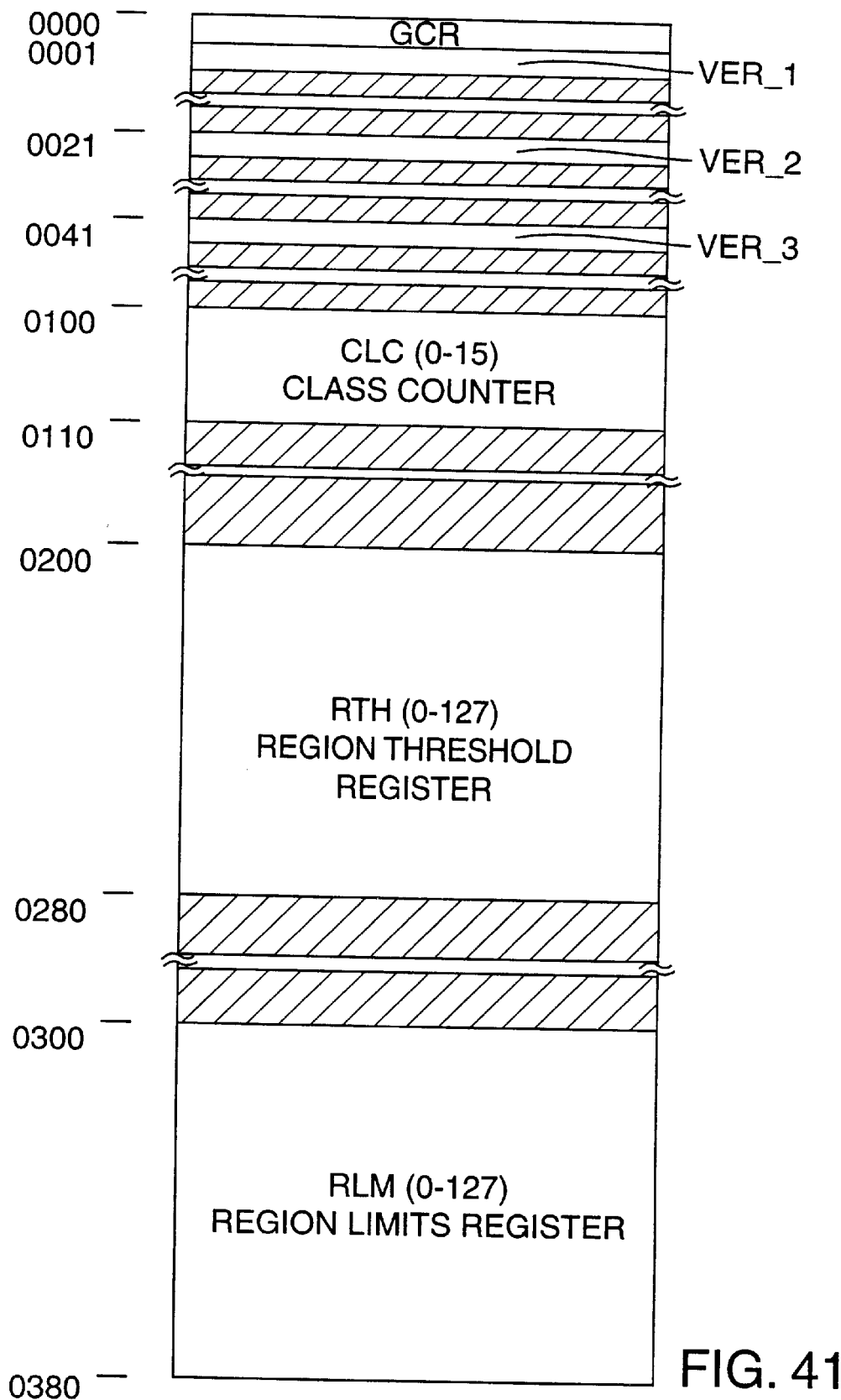

SIF internal registers are shown in FIG. 41 and described immediately below.

Figure 42:
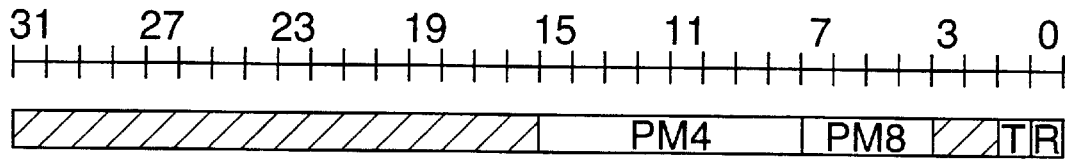

GCR—General Control Register (FIG. 42)

This register controls the operation of per-VC queuing.

| | |
|---|---|
| PM4 | (8 bits) Port Mode-4 combined ports
If PM4[i] is set, the combined Port i is in 622 MBit/sec operation. Combined Port i => Port(i), Port(i+8), Port(i+16), Port(i+24) |
| PM8 | (4 bits) Port Mode-8 combined ports
If PM8[i] is set, the combined Port i is in 1.2 GBit/sec operation. Combined Port i => P(i), P(i+4), P(i+8), P(i+12), P(i+16), P(i+20), P(i+24), P(i+28) |
| R | (1 bit) Receive Enable |
| T | (1 bit) Transmit Enable |

Figure 43:
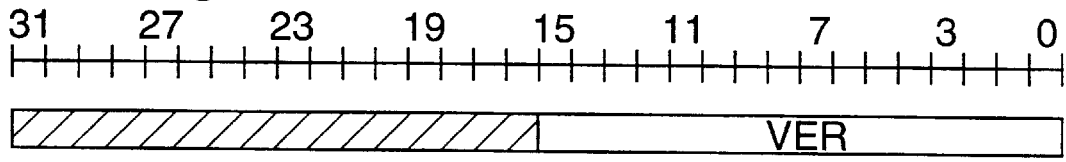

VER_i—Version Register (FIG. 43)

SIF 1420 is implemented in 3 chips SIF_1, SIF_2, SIF_3. Accordingly, there are three VER_1 registers, one per SIF device (VER_1 corresponds to SIF_1, and so on).

| | |
|---|---|
| VER | (16 bits) Version number. |

Figure 44:
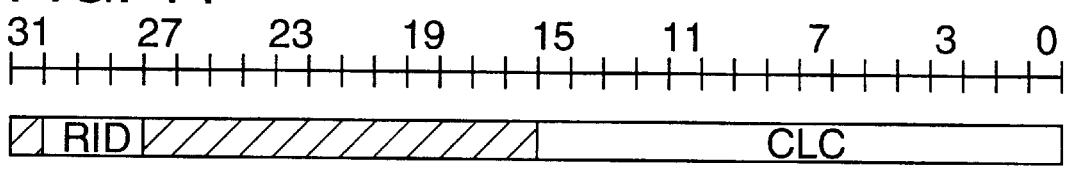

CLC—Class Counter (FIG. 44)

There are 16 class counter registers (one for each class) in SIF 1420. These counters are cleared on reset and incremented every time a cell is received in the class. A class counter is decremented when a cell in the class is transmitted and released to the free cell buffer stack. The user can read these registers any time during the operation. Writing to the registers is supported for testing only and should not be done in normal operation.

The RID fields of CLC registers form region ID table 1130 of FIG. 22. The CLC fields form table 1120 of FIG. 22.

Each RID field is cleared on reset and updated every time the Class Counter crosses a region boundary.

| | |
|---|---|
| CLC | (16 bits) Class Counter (initially 0). |
| RID | (3 bits) Region Id (0 to 7). |

Figure 45:
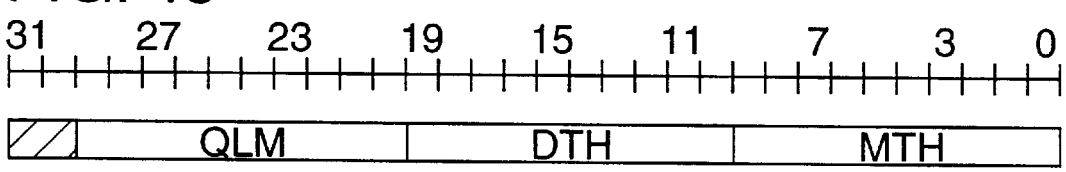

RTH—Region Threshold Register (FIG. 45)

There are 128 Region Threshold Registers (8 for each class, 1 register for each region) in SIF 1420. These registers form threshold table 1170 of FIG. 22. These registers should be initialized by the user.

| | |
|---|---|
| QLM | (10 bits) Queue Limit. |
| DTH | (10 bits) Discard Threshold. |
| MTH | (10 bits) Marking Threshold. |

All thresholds have a granularity of 16 cells.

The maximum size of queue 110 is 16K-1 cells, which is a 14-bit space. The four LSBs of each threshold are 1111. Therefore, the minimum value of each threshold is fifteen (00_0000_0000_1111 binary), and the maximum value is 16K-1 (11_1111_1111_1111 binary).

Figure 46:
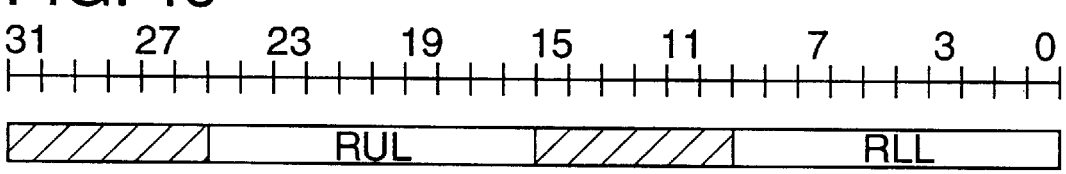

RLM—Region Limits Register (FIG. 46)

There are 128 Region Limits Registers (8 for each class, 1 register for each region) in SIF 1420. These registers form tables 1150, 1160 in FIG. 22. These registers should be initialized by the user.

| | |
|---|---|
| RUL | (10 bits) Region Upper Limit (table 1160). |
| RLL | (10 bits) Region Lower Limit (table 1150). |

Both limits have a granularity of 64 cells.

The maximum class size is 64K-1 cells, which is a 16-bit space. The LSBs of each upper limit are 111111, and the LSBs of each lower limit are all zeros. Therefore, the minimum upper limit is 63 (00_0000_0000_111111 binary), and the maximum upper limit is 64K-1 (11_1111_1111_111111 binary). The minimum lower limit is zero (00_0000_0000_000000 binary), and the maximum lower limit is 64K-64 (11_1111_1111_000000 binary).

Figure 47:
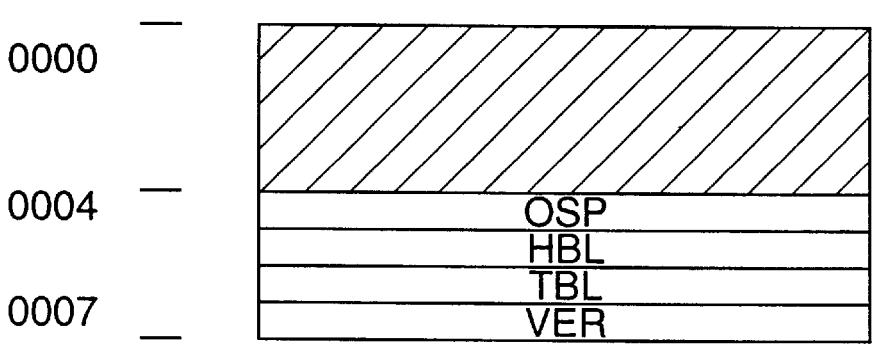

PVC Internal Registers (FIG. 47) are described immediately below.

Figure 48:
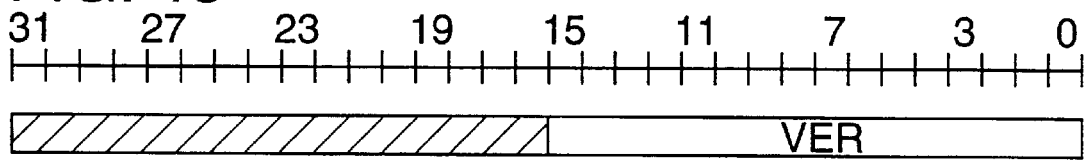

VER—Version Register (FIG. 48).

| | |
|---|---|
| VER | (16 bits) Version number. |

Figure 49:
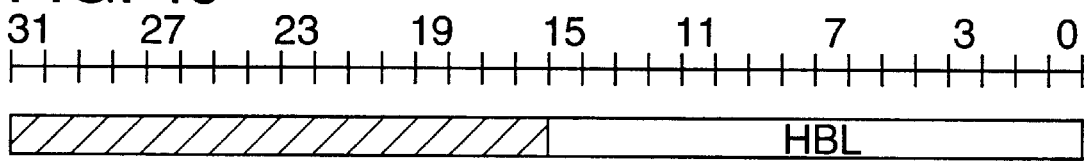

HBL—Head of Background List (FIG. 49).

| | |
|---|---|
| HBL | (16 bits) Head of Background List. |

Figure 50:
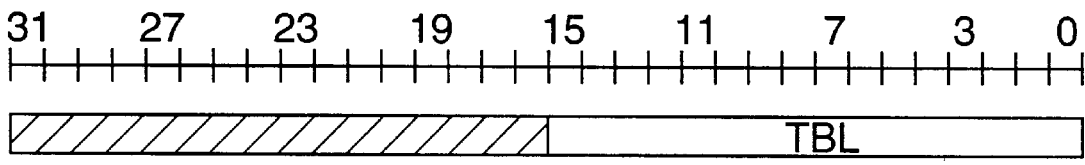

TBL—Tail of Background List (FIG. 50).

| | |
|---|---|
| TBL | (16 bits) Tail of Background List. |

Figure 51:
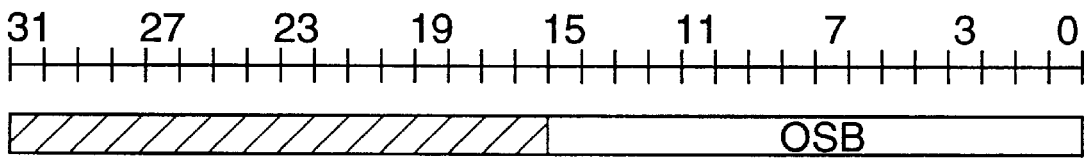

OSP—output VC Stack Pointer (FIG. 51).

| | |
|---|---|
| OSP | (16 bits) Output VC Stack Pointer. |

In some embodiments, SIF 1420, each PVC 1440 and each SCH 1450 (FIG. 25) is a separate integrated circuit (separate chip). Such construction enables one to provide per-VC queuing as an additional function to an existing switch controller 1410. In some embodiments, the SIF, PVC and SCH chips provide the following features:

1. Up to 64K Input VCs total
2. Up to 128K (64*2) Output VCs total (each block of 16 ports may have up to 64K Output VCs).

3. Each Input VC may have up to 16 K cells
4. Each Input VC may belong to one of the 16 Classes.
5. Class fullness state indication for every Class.
6. Up to 255 Output VCs can be associated with one Input VC (multicast). Several such OVCs may belong to the same output port.
7. Port 32 (CPU port, handled by the even-ports PVC) has its own OVCs. For these OVCs, a new header is not generated. Instead, the CPU is provided with the IVC id.
8. Setup new connection in three cell times (three switch cycles). Adding a party to a multicast connection in two cell times.

The embodiments described above illustrate but do not limit the invention. The invention is not limited by any particular circuity, signals, data structures, the number of queues or thresholds, or values of any parameters. Other embodiments and variations are within the scope of the invention, as defined by the appended claims.

APPENDIX 1

Data Cell

In addition to cell payload and attributes the ATM switch has the following data fields for each cell:

NXT—(18 bits) Next Cell Pointer. Used to link cells together.
CCNT—(10 bits) Copy Counter.
FLGS—Cell Flags, including:
  L—next cell (pointed to by NXT) is the last cell in a frame.
  M—next cell (pointed to by NXT) is a marker cell

APPENDIX 2

The IVC data structure has the following fields:
WP—(18 bits) Write Pointer. The address of the last cell in the IVC Queue.
TP—(18 bits) Tail Pointer. The address of the last cell in the IVC Queue (Normal Mode) or the last cell in the last full frame in the IVC Queue (FBOM).
CHP—(16 bits) Chain Head Pointer. The pointer to the first Output VC in the chain.
CTP—(16 bits) Chain Tail Pointer. The pointer to the last Output VC in the chain.
ECNT—(14 bits) Entry Counter. Number of cells in the queue for this IVC.
OCNT—(10 bits) Output Counter. Number of Output VCs which belong to this IVC.
CLID—(4 bits) Class Id.
FLGS—IVC Status & Control Flags, such as:
  F—Frame mode (0-Normal; 1-FBOM)
  C—Chain is Ready (0-Empty; 1-Ready)
  R—Read Pointer RP of the first (head) OVC in the IVC's chain is Valid (0-not Valid; 1-Valid)
  P—Partial Frame (0-Full frame/empty; 1-Partial frame)
EST—EPD State (2 bits)
  00 —Start of Frame
  01—Frame Receive
  10—Frame Discard
  11—Tail Discard
E—EPD Enable (0-Disable, 1-Enable)
I—EFCI Marking Enable (0-Disable, 1-Enable)
N—Congestion Notification
M—Marker Bit (set when Marker Cell is linked to the Queue and reset when the Marker Cell is removed)
H—Hold Bit (when set this bit inhibits the Chain transfer to BG list)

APPENDIX 3

The OVC data structure has the following fields:
RP—(18 bits) Read Pointer. The Address of the next cell to transmit on the OVC.
NewHdr—(28 bits) New Cell Header.
NXT—(16 bits) Next OVC Pointer. Used to link OVCs together.
IVC—(16 bits) Input VC. Number of parent IVC.
FLGS—OVC Status & Control Flags, such as:
A—OVC (for Multicast Party Addition). 0-normal, 1 added.
D—Drop connection flag.
R—Read Pointer is Valid for OVC pointed to be NXT of present OVC. 0-not valid, 1-valid.
L—Read Pointer points to the last cell of a frame
M—Read Pointer points to a marker cell
V—VP connection flag (0-VC; 1-VP)

APPENDIX 4

Setting up a Connection

1. IVC set up.
1a. OCNT=1 (for a single OVC).
1b. ECNT=0 (0 cells in the queue).
1c. CLID=class id (0 through 15).
1d. CHP, CTP=OVC number (pointer to OVC structure).
1e. F=frame mode (1 means FBOM, 0 means normal mode).
1f. C=1.
1g. R=0.
1h. P=0.
1i. EST=00 ("Start of Frame").
1j. E=appropriate value (specified by CPU).
1k. I=appropriate value (specified by CPU).
1l. H=appropriate value.
1m. M=0.
2. OVC set up.
2a. NewEdr=new header VPI/VCI.
2b. IVC=pointer to IVC.
2c. A=0.
2d. D=0.
2e. V=0 if VC connection, 1 if VP connection.

APPENDIX 5

Adding a Party to a Connection

1. In IVC:
1a. CHE=pointer to new OVC.
1b. CTF: if IVC's C==0 (no chain), then CTP=pointer to new OVC else CTP is unchanged.
1c. Increment OCNT.
1d. C=1.
1e. R=0.

2. In new OVC:
   2a. NewHdr=new header.
   2b. IVC=pointer to IVC.
   2c. A=1 if P==1, A=0 if P==0.
   2d. D=0.
   2e. V=0 if VC connection, 1 if VP connection.
   2f. NXT=previous value of CHP.

APPENDIX 6

Receiving a New Cell

1. In cells:
   1a. if the new cell is not the only cell in the queue, then:
      if FBOM and this is the last cell in the frame,
      L=1 in the previous cell
      else L=0 in the previous cell.
   1b. CCNT=IVC's OCNT.
2. In IVC:
   2a. WP=pointer to new cell.
   2b. Increment ECNT.
   2c. If F==1 (FBOM), then
      2c-1. if L==1 then P=0
         else if P==1 then skip steps 2d–2e else
      2c-2. P=1; skip steps 2d–2e.
   2d. If F==0 (not FBOM), or if F==1 and cell is the last in a frame, then TP=pointer to cell. Otherwise TP is unchanged.
   2e. If C==1 and H==0, then
      2e-1. C=0.
      2e-2. Move IVC chain to background list.
3. In OVC:
   3a. If IVC's C==1 and IVC's R==0, then
      3a-1. IVC's R=1.
      3a-2. RP[CHP]=pointer to cell. Set L[CHP], M[CHP] to appropriate values.

I claim:

1. A method for processing cells in an ATM switch, the method comprising:
   creating one or more queues for the cells;
   determining a region ID for the one or more queues, wherein the range of the possible number of cells in the one or more queues is subdivided into regions and the region ID identifies the region containing the current number of cells in the one or more queues;
   determining a threshold for the number of cells from the region ID in order to control congestion of the switch; and
   changing the threshold when the region ID changes so that threshold changes inversely depending on the number of cells.

2. The method of claim 1 further comprising creating a plurality of queues for the cells, wherein the threshold is a threshold for the number of cells in a single queue, and
   wherein changing the threshold includes increasing the threshold when the total number of cells in said queues decreases.

3. The method of claim 2 wherein a separate queue is created for cells received on each virtual channel.

4. The method of claim 1 further comprising creating a plurality of queues for the cells, wherein the threshold is a threshold for the number of cells in a single queue, and
   wherein changing the threshold includes decreasing the threshold when the total number of cells in said queues increases.

5. The method of claim 4 wherein a separate queue is created for cells received on each virtual channel.

6. The method of claim 1 further comprising creating a plurality of queues for the cells, wherein the threshold is a queue limit such that when a cell arrives for any queue Q1 which is one of the queues, and the total number of cells in the queue Q1 exceeds the threshold, the cell is discarded.

7. The method of claim 1 further comprising creating a plurality of queues for the cells, wherein the threshold is a marking threshold such that when a cell arrives for any queue Q1 which is one of the queues, and when the total number of cells in the queue Q1 exceeds the threshold, the switch indicates that cells from the queue Q1 are to be transmitted with an overload indication.

8. A method for processing cells in an ATM switch, the method comprising:
   creating a plurality of queues for the cells;
   setting a threshold for the number of cells in order to control congestion of the switch; and
   changing the threshold depending on congestion of the switch;
   wherein the threshold is a discard threshold such that when any cell C1 arrives for any queue Q1 which is one of the queues, and when the total number of cells in the queue Q1 exceeds the threshold, then:
      if the cell C1 arrives in the frame based operation mode in which each frame of cells from one input virtual channel (IVC) is transmitted to a destination port or sub-port without any intervening cells from other IVCs or frames, and the cell C1 is the first cell in a frame, then the whole frame is discarded, but if the cell C1 is not the first in a frame and a previous cell in the frame was not discarded, then the cell C1 is not discarded;
      if the cell C1 arrives in the normal mode with the cell loss priority flag CLP=1, the cell is discarded, but if CLP=0, the cell is not discarded.

9. The method of claim 1 further comprising creating a separate queue of cells for each input virtual channel (IVC), the queues being subdivided into classes of queues, wherein the range of the possible number of cells in each class of queues is subdivided into regions and a separate region ID is provided for each class to identify the region containing the current number of cells in the class, wherein a separate threshold is provided for each region of each class of queues, each threshold being determined by the region ID of the class, wherein at least two thresholds for different classes are different from each other.

10. The method of claim 1 wherein at least two of the regions overlap, and the region ID changes so that:
    when the number of cells increases, the region ID changes not before the number of cells reaches an upper limit of a region; and
    when the number of cells decreases, the region ID changes not before the number of cells reaches a lower limit of a region.

11. The method of claim 1 wherein at least two of the regions overlap, and the region ID changes with a hysterisis based on the direction of change of the number of cells when the number of cells moves between overlapping regions.

12. The method of claim 1 wherein the regions do not overlap.

13. An ATM switch comprising:
    a circuit for creating one or more queues for cells;
    a circuit for determining a region ID for the one or more queues, wherein the range of the possible number of cells in the one or more queues is subdivided into regions and the region ID identifies the region containing the current number of cells in the one or more queues; and a circuit for determining a threshold for the number of cells from the region ID in order to control congestion of the switch so that the threshold changes inversely depending on the number of cells when the region ID changes.

14. The switch of claim 13 further comprising a circuit for creating a plurality of queues for the cells, wherein the threshold is a threshold for the number of cells in a single queue, and wherein the circuit for changing the threshold includes a circuit for increasing the threshold when the total number of cells in said queues decreases.

15. The switch of claim 14 wherein the circuit for creating a plurality of queues comprises a circuit for creating a separate queue for cells received on each virtual channel.

16. The switch of claim 13 further comprising a circuit for creating a plurality of queues for the cells, wherein the threshold is a threshold for the number of cells in a single queue, and wherein the circuit for changing the threshold includes a circuit for decreasing the threshold when the total number of cells in said queues increases.

17. The switch of claim 16 wherein the circuit for creating a plurality of queues comprises a circuit for creating a separate queue for cells received on each virtual channel.

18. The switch of claim 13 further comprising a circuit for creating a plurality of queues for the cells, wherein the threshold is a queue limit such that when a cell arrives for any queue Q1 which is one of the queues, and the total number of cells in the queue Q1 exceeds the threshold, the cell is discarded.

19. The switch of claim 13 further comprising a circuit for creating a plurality of queues for the cells, wherein the threshold is a marking threshold such that when a cell arrives for any queue Q1 which is one of the queues, and the total number of cells in the queue Q1 exceeds the threshold, the switch indicates that cells from the queue Q1 are to be transmitted with an overload indication.

20. An ATM switch comprising:

a circuit for creating a plurality of queues for cells;

a circuit for setting a threshold for the number of cells in order to control congestion of the switch; and a circuit for changing the threshold depending on congestion of the switch;

wherein the threshold is a discard threshold such that when a cell C1 arrives for any queue Q1 which is one of the queues, and the total number of cells in the queue Q1 exceeds the threshold, then:

if the cell C1 arrives in the frame based operation mode in which each frame of cells from one input virtual channel (IVC) is transmitted to a destination port or sub-port without any intervening cells from other IVCs or frames, and the cell C1 is the first cell in a frame, then the whole frame is discarded, but if the cell C1 is not the first in a frame and a previous cell in the frame was not discarded, then the cell C1 is not discarded;

if the cell C1 arrives in the normal mode with the cell lost priority flag CLP=1, the cell is discarded, but if CLP=0, the cell is not discarded.

21. The switch of claim 13 further comprising a circuit for creating a separate queue of cells for each input virtual channel (IVC), the queues being subdivided into classes of queues, wherein the range of the possible number of cells in each class of queues is subdivided into regions and a separate region ID is provided for each class to identify the region containing the current number of cells in the class, wherein a separate threshold is provided for each region of each class of queues, each threshold being determined by the region ID of the class, wherein at least two thresholds for different classes are different from each other.

22. The ATM switch of claim 10 wherein at least two of the regions overlap, and the switch comprises a circuit for changing the region ID so that:

when the number of cells increases, the region ID changes not before the number of cells reaches an upper limit of a region; and when the number of cells decreases, the region ID changes not before the number of cells crosses a lower limit of a region.

23. An ATM switch comprising:

a circuit for creating a plurality of classes of queues for ATM cells;

a circuit for providing a class ID that identifies the class containing the queue for an incoming cell;

a class counter table for storing a class counter for each class, wherein the class counter is a current number of cells in each class, and for providing a class counter in response to a class ID;

a region ID table for storing a current region ID for each class, wherein the range of the possible number of cells in each class is subdivided into regions and the region ID for each class identifies the region containing the current number of cells in the class, the region ID table being for providing a region ID in response to a class ID;

one or more limit tables for storing upper and lower limits for each region of each class, and for providing the upper and lower limits in response to a class ID and a region ID; and a circuit for comparing a class counter with the upper and lower limits and for changing the respective region ID when the class counter indicates that the region ID is to be changed.

24. The ATM switch of claim 23 further comprising:

a threshold table for storing one or more thresholds for each class and each region, and for providing the one or more thresholds in response to a class ID and a region ID; and a circuit for comparing the one or more thresholds with a number of cells in the queue for which a cell is received, and for generating a signal indicating which, if any, of the thresholds is exceed by the number of cells in said queue.

25. The ATM switch of claim 23 wherein the circuit for creating a plurality of classes of queues for ATM cells is to create a separate queue for each input virtual channel.

26. A method for processing cells in an ATM switch, the method comprising:

creating a plurality of classes of queues for ATM cells;

providing a class ID that identifies the class containing the queue for an incoming cell;

a class counter table storing a current number of cells in each class and providing the class counter in response to the class ID;

a region ID table storing a current region ID for each class, wherein the range of the possible number of cells in each class is subdivided into regions and the region ID for each class identifies the region containing the current number of cells in the class, the region ID table providing the region ID for the incoming cell in response to the cell's class ID;

one or more limit tables storing upper and lower limits for each region of each class, and providing the upper and lower limits in response to the class ID and the region ID of the incoming cell; and comparing a class counter with the upper and lower limits and changing the respective region ID if the class counter indicates that the region ID is to be changed.

27. The method of claim 26 further comprising:

a threshold table storing one or more thresholds for each class and each region, and providing the one or more thresholds in response to the class ID and the region ID of the incoming cell; and comparing the one or more thresholds with a number of cells in the queue for which the cell is received, and generating a signal indicating which, if any, of the thresholds is exceed by the number of cells in said queue.

28. The method of claim 26 wherein creating a plurality of classes of queues for ATM cells comprises creating a separate queue for each input virtual channel.

29. A method for processing network data in a network routing apparatus, the method comprising:

creating one or more queues for the network data;

determining a region ID for the one or more queues, wherein the range of the possible amount of data in the one or more queues is subdivided into regions and the region ID identifies the region containing the current amount of data in the one or more queues;

determining a threshold for the amount of data from the region ID in order to control congestion of the apparatus; and changing the threshold when the region ID changes so that the threshold changes inversely depending on the amount of data.

30. The method of claim 29 wherein the data are queued and transmitted in fixed size data units, and the region ID identifies the region containing the current number of data units in the one or more queues.

31. A network routing apparatus comprising:

a circuit for creating one or more queues for network data;

a circuit for determining a region ID for the one or more queues, wherein the range of the possible amount of data in the one or more queues is subdivided into regions and the region ID identifies the region containing the current amount of data in the one or more queues; and a circuit for determining a threshold for the amount of data from the region ID in order to control congestion of the apparatus so that the threshold changes inversely depending on the amount of data when the region ID changes.

32. The apparatus of claim 31 wherein the data in the queues are in fixed size data units, and the region ID identifies the region containing the current number of data units in the one or more queues.

* * * * *